US009936208B1

(12) United States Patent
Brailovskiy et al.

(10) Patent No.: US 9,936,208 B1
(45) Date of Patent: Apr. 3, 2018

(54) ADAPTIVE POWER AND QUALITY CONTROL FOR VIDEO ENCODERS ON MOBILE DEVICES

(71) Applicant: Amazon Technologies, Inc., Seattle, WA (US)

(72) Inventors: Ilya Vladimirovich Brailovskiy, Mountain View, CA (US);
Marcus-Alan Gilbert, Plano, TX (US);
Dmitry Svetlov, Santa Clara, CA (US);
Amir Frenkel, San Jose, CA (US);
Paul Berenberg, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 373 days.

(21) Appl. No.: 14/747,156

(22) Filed: Jun. 23, 2015

(51) Int. Cl.
*H04N 19/42* (2014.01)
*H04N 19/29* (2014.01)
*H04N 19/59* (2014.01)

(52) U.S. Cl.
CPC ............. *H04N 19/42* (2014.11); *H04N 19/29* (2014.11); *H04N 19/59* (2014.11)

(58) Field of Classification Search
None
See application file for complete search history.

(56) References Cited

U.S. PATENT DOCUMENTS

| | | | | |
|---|---|---|---|---|
| 8,548,062 | B2 * | 10/2013 | Ma | H04N 19/176 375/240.25 |
| 2006/0018378 | A1 * | 1/2006 | Piccinelli | H04N 19/172 375/240.03 |
| 2006/0234655 | A1 * | 10/2006 | Ikedo | H03F 1/0222 455/127.1 |
| 2015/0131713 | A1 * | 5/2015 | Kim | H04N 19/132 375/240.02 |

* cited by examiner

*Primary Examiner* — Christopher S Kelley
*Assistant Examiner* — Kaitlin A Retallick
(74) *Attorney, Agent, or Firm* — Pierce Atwood LLP

(57) ABSTRACT

Devices, systems and methods are disclosed for improving encoding techniques for mobile devices by adaptively controlling a resolution or frame rate of content to reduce power consumption while maintaining image quality. For example, a local device may determine when the content may be downscaled without degrading a final image quality and may downscale the content prior to encoding and transmitting the encoded content to a remote device. The remote device may decode and upscale the content to the original resolution prior to displaying the content on a display. As downscaling the content is not power intensive, the local device may reduce a power consumption associated with encoding and transmitting the content to the remote device while maintaining the final image quality of the content.

21 Claims, 20 Drawing Sheets

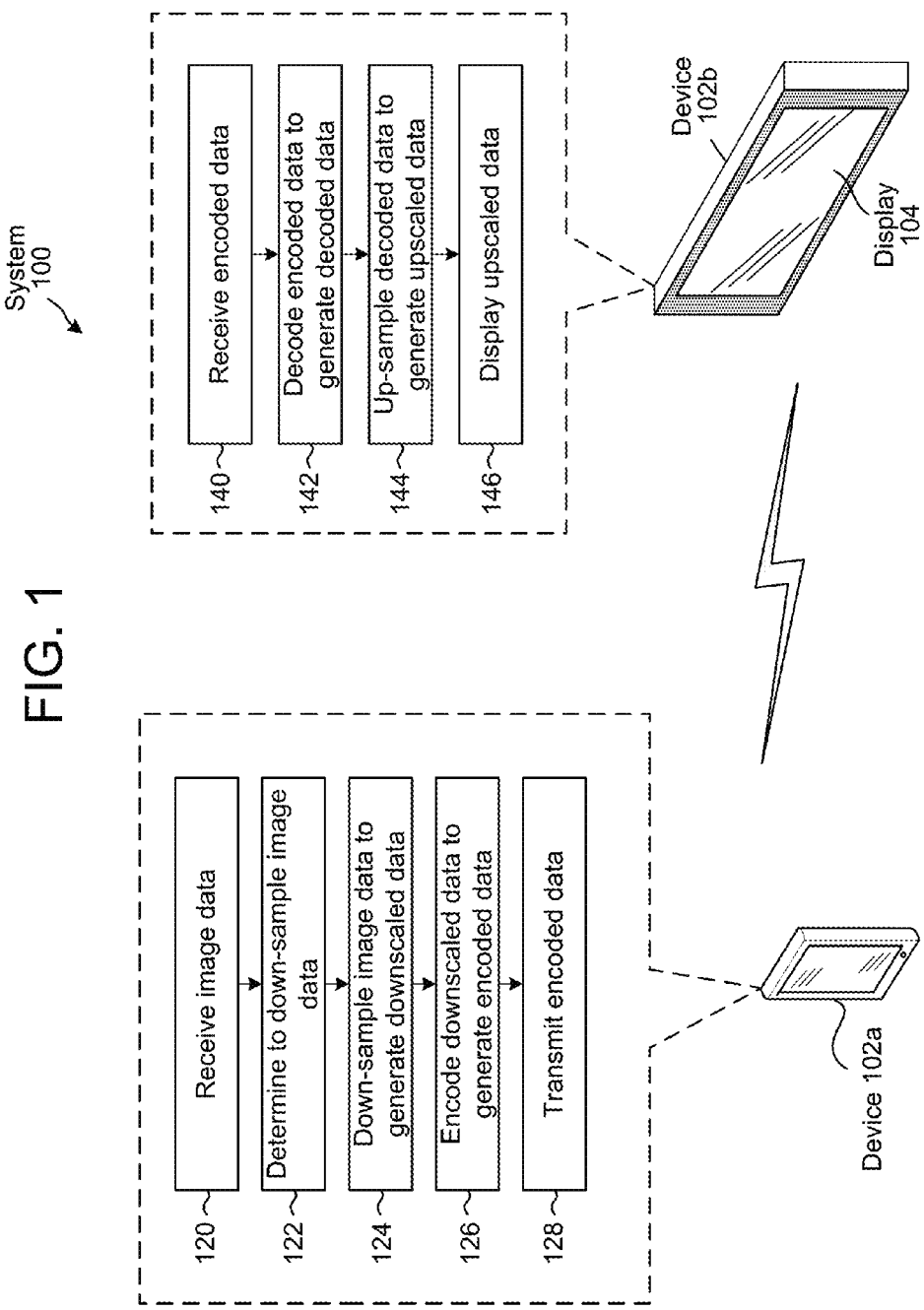

FIG. 3B
Original Image Data 312
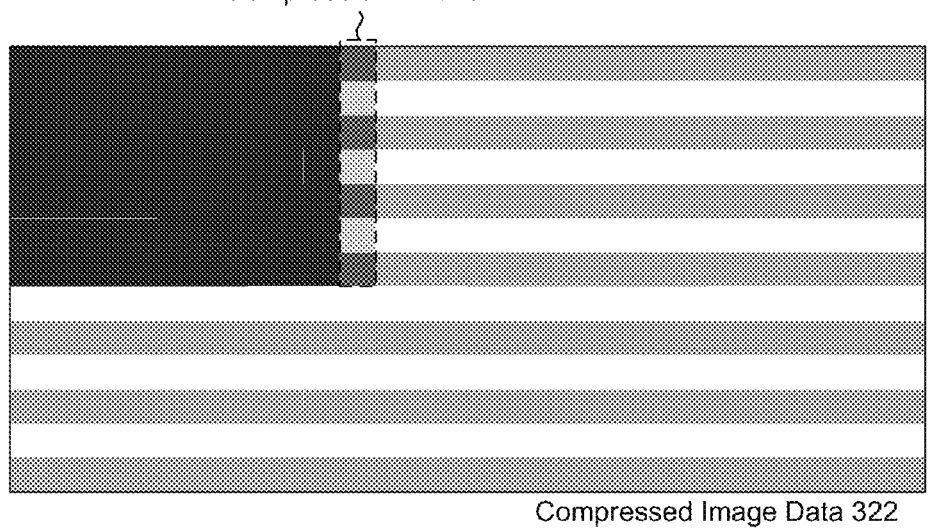
Compression Error 324
Compressed Image Data 322
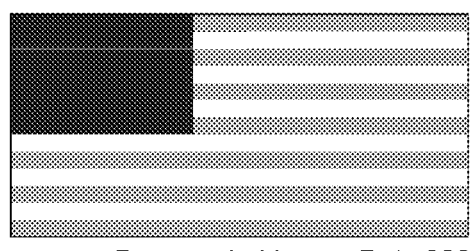
Downscaled Image Data 332

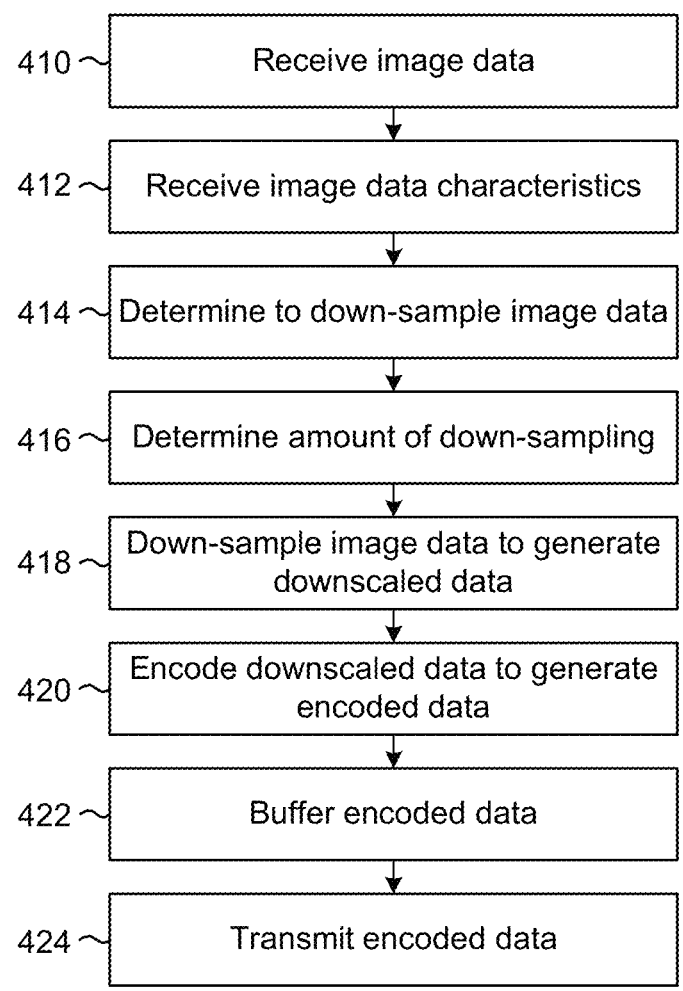

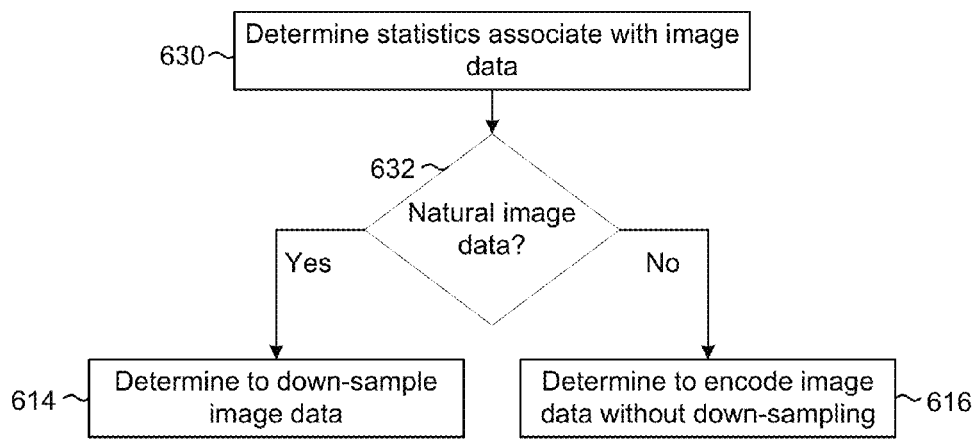
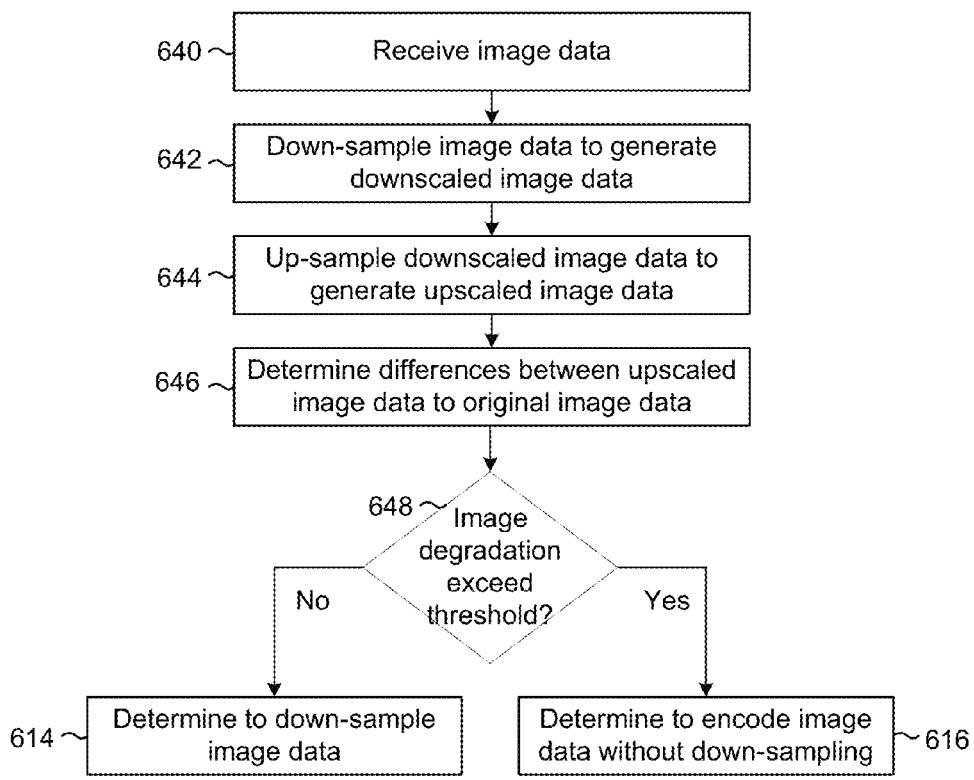

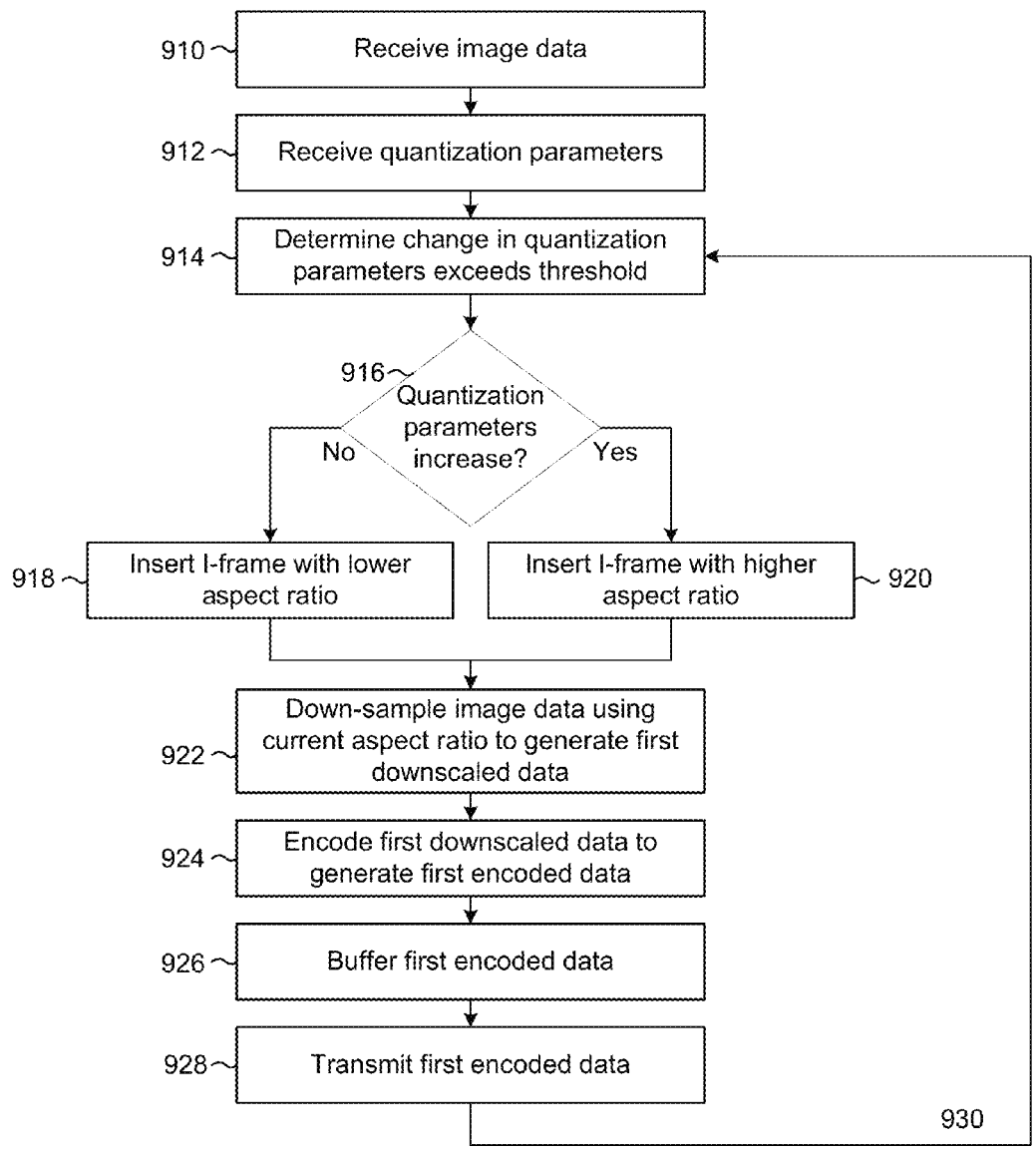

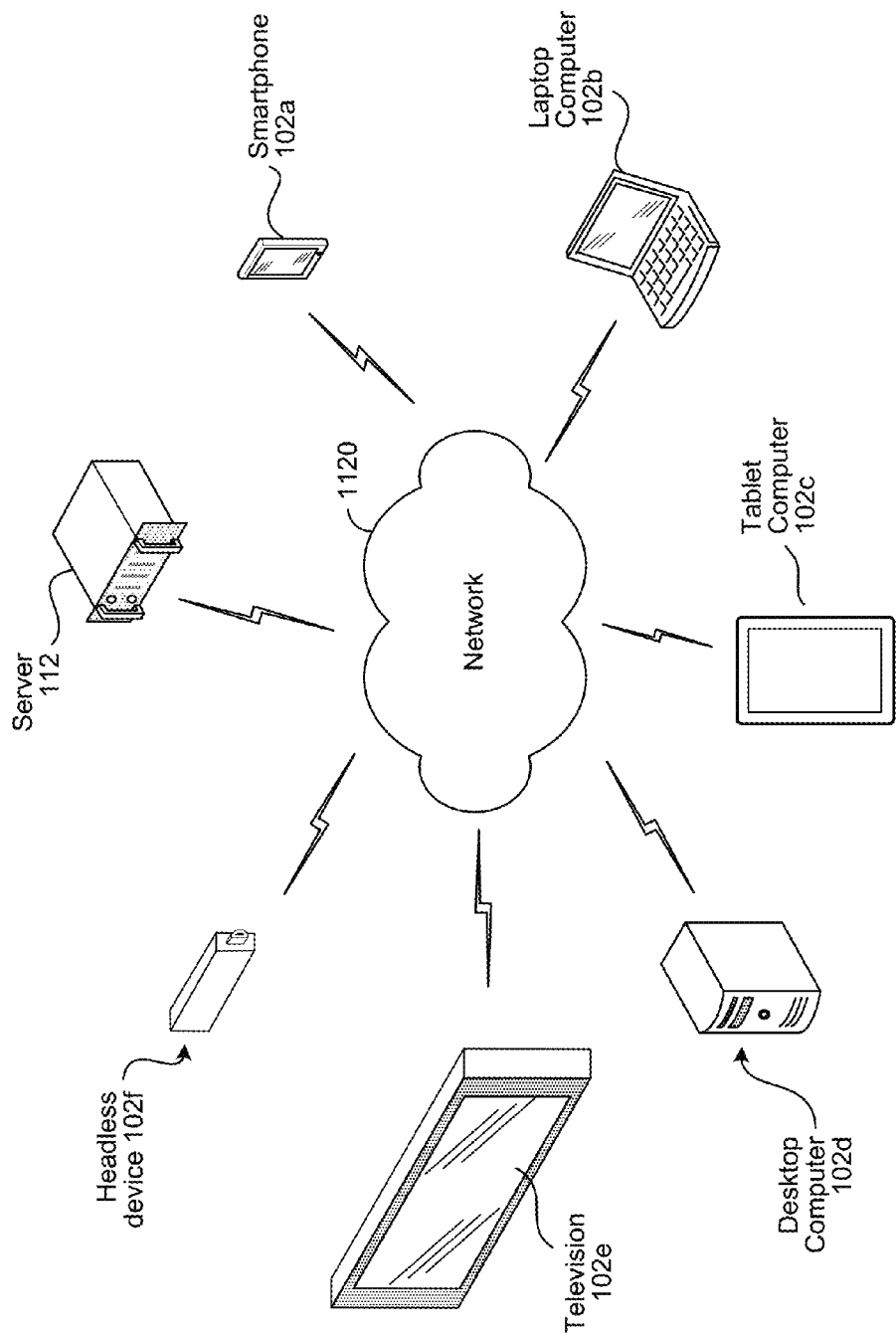

ADAPTIVE POWER AND QUALITY CONTROL FOR VIDEO ENCODERS ON MOBILE DEVICES

BACKGROUND

With the advancement of technology, the use and popularity of electronic devices has increased considerably. Electronic devices are commonly used to display video data using a display. Some electronic devices may transmit video data to a remote device to display on a remote display.

BRIEF DESCRIPTION OF DRAWINGS

For a more complete understanding of the present disclosure, reference is now made to the following description taken in conjunction with the accompanying drawings.

FIG. 1 illustrates an overview of a system for adaptively controlling a resolution according to embodiments of the present disclosure.

FIGS. 3A-3B illustrate examples of different compression methods including controlling a resolution according to embodiments of the present disclosure.

FIG. 4 is a flowchart conceptually illustrating an example method for downscaling and encoding image data according to embodiments of the present disclosure.

FIGS. 6A-6H are flowcharts conceptually illustrating example methods for determining to downscale image data according to embodiments of the present disclosure.

FIGS. 9A-9B are flowcharts conceptually illustrating example methods for controlling a resolution using intra-coded pictures according to embodiments of the present disclosure.

FIG. 12 is a block diagram conceptually illustrating an example of a computer network for use with the present system.

DETAILED DESCRIPTION

Figure 2A:
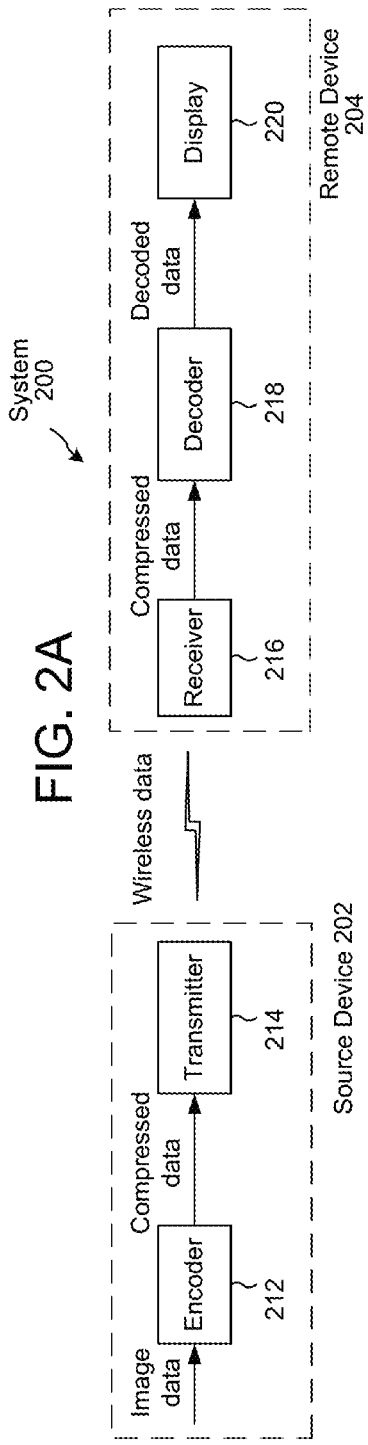
FIGS. 2A-2C illustrate example system diagrams for encoding and decoding image data, including adaptively controlling a resolution according to embodiments of the present disclosure.

Electronic devices are increasingly used to display content, such as images and videos. As a quality of the content increases, a corresponding size of the content or bandwidth required to broadcast or stream the content increases accordingly. Due to storage and transmission limitations, it is beneficial to reduce the size of the content or the bandwidth required to broadcast/stream the content, which may be done by encoding and/or compressing the content. However, if a video encoder is running constantly on an electronic device, the video encoder may consume a significant amount of power, which is a consideration for mobile devices. Further, due to compression techniques used to compress high resolution content, the encoding process may reduce a final image quality of the content when the content is displayed on a remote display.

To improve encoding techniques for mobile devices, devices, systems and methods are disclosed that reduce power consumption while maintaining image quality by adaptively controlling a resolution and/or frame rate of the content prior to the content being transmitted. For example, a local device may determine when the content may be downscaled without degrading a final image quality. When the content cannot be downscaled without degrading the final image quality, the local device may simply encode and transmit the content to a remote device. When the content can be downscaled without degrading the final image quality, the local device may downscale the content prior to encoding and transmit the downscaled and encoded content to the remote device. The remote device may then decode and upscale the content to the desired (e.g., original) resolution prior to displaying the content on a display. As downscaling the content is not power intensive, the local device may reduce a power consumption associated with encoding and transmitting the content to the remote device while maintaining the final image quality of the content. In addition, the local device may determine a region of interest within the content and may use the final image quality of the region of interest to determine whether to downscale the content. Thus, the local device may decide to downscale the content based on a particular region of interest within the content and ignore image degradation outside of the region of interest.

FIG. 1 illustrates an overview of a system 100 for implementing embodiments of the disclosure. The system 100 includes a first device 102*a*, such as a mobile device, and a second device 102*b*, such as a television having a display 104. However, the present disclosure is not limited thereto and the second device 102*b* may be any electronic device including a processor, for example a "headless" device without a built in display (such as a cable box) that receives image signals and sends them to a separate device for display. As illustrated in FIG. 1, the first device 102*a* may transmit content to the second device 102*b* to be displayed. Prior to transmitting the content, the first device 102*a* may adaptively control a resolution of the content and encode the content.

The first device 102*a* may receive (120) image data to transmit to the second device 102*b*. The image data may be associated with a digital image (e.g., an image taken with a camera), a digital display (e.g., pixel data being displayed on a display of the first device 102*a*) or a video (e.g., video data may include a plurality of image/video frames which may generally be referred to as image data). For example, the image data may be used for media sharing, such as when the first device 102*a* is a smartphone and mirrors a display of the smartphone on an external television or transmits video data to be displayed on the external television. Alternatively or additionally, the image data may be used for video streaming, such as when the first device 102*a* is a videoconference device and captures and transmits video data.

The first device 102*a* may determine (122) to downsample the image data. For example, the first device 102*a* may determine that the image data may be downscaled without degrading a final image quality associated with the image data, such as when the image data includes a strong signal (e.g., low noise), less detailed subjects (e.g., relatively small number of high frequency components) or the like. Thus, the first device 102a may down-sample image data that may be up-sampled without distortion and/or a loss of image quality and may determine not to down-sample image data that would result in a loss of detail, additional distortions and/or a loss of image quality.

As will be discussed in greater detail below with regard to FIGS. 6A-6H, the first device 102a may determine to down-sample the image data based on characteristics (e.g., metric values) of the image data, such as a quantization parameter (QP), camera statistics, a digital gain associated with a camera sensor, statistics associated with the image data, noise level statistics or the like. For example, the first device 102a may determine a complexity of the image data, such as if the image data includes high frequency signals, high noise levels or other complex information. The complexity of the image data may be determined using various metrics, such as frequency analysis, temporal complexity, spatial complexity, standard deviation for color values or the like. Typically, a large quantization parameter, large digital gain, high noise level statistics or the like correspond to complex image data that will suffer image degradation during downscaling. However, less complex image data may be downscaled and upscaled without resulting in image degradation. Therefore, the first device 102a may determine to downscale image data based on smaller quantization parameters, smaller digital gains, lower noise level statistics or the like.

For example, block-based video encoding schemes are inherently lossy processes. They achieve compression not only by removing redundant information, but also by making small quality compromises in ways that are intended to be minimally perceptible. In particular, the quantization parameter used in some encoding schemes regulates how much spatial detail is saved. When the quantization parameter is very small, almost all detail is retained. As the quantization parameter increases, some detail is aggregated so that the bit rate is reduced—but at the price of an increase in distortion and loss of quality. To avoid causing a loss of quality, the first device 102a may determine not to downscale the image data if the quantization parameter is above a threshold.

Similarly, a large digital gain associated with a camera sensor may correspond to complex image data as the large digital gain used to increase signals also increases noise. As a result, the device 102 may determine not to downscale image data associated with a large digital gain to maintain an image quality when the image data is displayed on the second device 102b.

The device 102 may determine whether to down-sample the image data based on only a portion of the image data. For example, the device 102 may determine a Region of Interest (ROI) within the image data, such as a face, person, object or the like, and may determine to down-sample the image data based on the ROI. In one example, the device 102 may receive complex first image data with high frequency signals (e.g., frequent transitions between pixel values in close proximity) in a background of the first image data and low frequency signals (e.g., infrequent transitions between pixel values in close proximity) in a foreground of the first image data corresponding to an object (e.g., a car). The device 102 may determine that the object (e.g., car) is the ROI within the first image data and may determine that the ROI includes low frequency signals and may therefore be down-sampled and up-sampled without degradation of image quality in the ROI. Therefore, despite the first image data being complex and including high frequency signals in the background, the device 102 may determine to down-sample the first image data based on the low frequency signals associated with the ROI. In a second example, the device 102 may receive a non-complex second image with low frequency signals in a background of the second image data and high frequency signals in a foreground of the second image data corresponding to a person (e.g., a referee). The device 102 may determine that the person (e.g., referee) is the ROI within the second image data and may determine that the ROI includes high frequency signals and therefore cannot be down-sampled and up-sampled without degradation of image quality in the ROI. Therefore, despite the second image data being non-complex and including low frequency signals in the background, the device 102 may determine not to down-sample the second image data based on the high frequency signals associated with the ROI.

While the above examples illustrate image data including a single region of interest, the present disclosure is not limited thereto. Instead, the device 102 may determine multiple regions of interest within the image data and may analyze pixels associated with the multiple regions of interest to determine whether to down-sample the image data without departing from the present disclosure.

The first device 102a may down-sample (124) the image data to generate downscaled data. As will be discussed in greater detail below with regard to FIGS. 4, 5 and/or 7, the first device 102a may determine an amount of down-sampling based on the characteristics (e.g., metric values) of the image data, such as the quantization parameter, camera statistics, digital gain associated with a camera sensor, statistics associated with the image data, noise level statistics or the like. For example, the first device 102a may determine an amount of down-sampling based on an amount of complexity associated with the image data. Thus, the first device 102a may down-sample less complex image data to a greater extent without degradation of image quality. Therefore, the first device 102a may down-sample low complexity image data using a large downscaling factor, medium complexity image data using a small downscaling factor and high complexity image data using a downscaling factor of 1 (e.g., no downscaling). The first device 102a may encode (126) the downscaled data to generated encoded data and may transmit (128) the encoded data to the second device 102b.

When down-sampling the image data, the device 102 may change a resolution of the image data and/or a frame rate associated with the image data. For example, the image data may include image frames at a speed of 30 frames per second (fps) having a resolution of 2000 pixels by 1000 pixels. In some examples, the device 102 may reduce a resolution of the image data while maintaining the frame rate, such as by decreasing the resolution to 1000 pixels by 500 pixels while maintaining 30 fps. In other examples, the device 102 may reduce the frame rate associated with the image data while maintaining the resolution, such as by decreasing the frame rate to 20 fps while maintaining a resolution of 2000 pixels by 1000 pixels. In some examples, the device 102 may reduce the frame rate and the resolution.

In addition, when down-sampling the image data the device 102 may increase the resolution while decreasing the frame rate and/or increase the frame rate while decreasing the resolution. For example, the device 102 may detect motion between subsequent image frames (e.g., variations in pixel values in successive image frames exceeding a threshold) and may determine that a higher frame rate may be beneficial to maintain image quality while reducing power consumption. Therefore, the device 102 may reduce a resolution associated with the image data while increasing a frame rate associated with the image frames, such as reducing the resolution from 2000 pixels by 1000 pixels to 1000 pixels by 500 pixels and increasing the frame rate from 30 fps to 60 fps. Alternatively, the device 102 may detect static content between subsequent image frames (e.g., variations in pixel values in successive image frames below the threshold) and may determine that a lower frame rate and higher resolution may be beneficial to maintain image quality while reducing power consumption. Therefore, the device 102 may increase the resolution associated with the image data while reducing the frame rate associated with the image frames. In these examples, the device 102 may increase the frame rate/resolution in comparison to other down-sampled image data (e.g., down-sampled frame rate/resolution relatively increased but equal to or below an input frame rate/resolution of the input image data) or in comparison to the input image data (e.g., down-sampled frame rate/resolution increased above the input frame rate/resolution of the input image data). The device 102 may detect motion using computer vision or may receive an input from a user specifying a desired frame rate or the presence of motion.

The second device 102b may receive (140) the encoded data, may decode (142) the encoded data to generate decoded data, may up-sample (144) the decoded data to generate upscaled data and may display (146) the upscaled data on the display 104. Thus, the decoded data may be upscaled inversely proportional to an amount of downscaling performed on the image data. An image quality of the upscaled data displayed on the display 104 may be similar to an image quality of the original image data received by the first device 102a, and downscaling is not power intensive for the first device 102a. Therefore, when the first device 102a downscales the image data, power consumption associated with the encoding/decoding process and a bandwidth and processor consumption associated with transmitting the encoded data is reduced while an image quality associated with the upscaled image data is maintained.

In some examples, the device 102 may maintain a constant bit rate (e.g., number of bits that are conveyed or processed per unit of time) while down-sampling the image data. However, the present disclosure is not limited thereto and the bit rate may vary. For example, the device 102 may use the bit rate as an additional dimension for optimization, such as by reducing the bit rate in order to reduce the power consumption while maintaining the image quality.

As used herein, "down-sample" and "downscale" may be used interchangeably and "up-sample" and "upscale" may be used interchangeably. For example, a size of the image data may be down-sampled or downscaled from an original resolution of 2000 pixels by 1000 pixels to a downscaled resolution of 1000 pixels by 500 pixels. The downscaled resolution may be up-sampled or upscaled from the downscaled resolution back to the original resolution.

The device 102 may include a plurality of cameras and may determine to down-sample and/or an amount of downsampling differently for individual cameras. For example, the device 102 may include a front-facing camera and a rear-facing camera and may use a first threshold to determine to down-sample image data associated with the front-facing camera and may use a second threshold to determine to down-sample image data associated with the rear-facing camera. In some examples, the device 102 may capture image data from an individual camera only if a region of interest is in front of the camera and may not capture image data if the region of interest is to the side of the camera. In other examples, however, the device 102 may include four or more cameras with overlapping field of views. In these examples, the device 102 may capture image data when the region of interest is to the side of the camera as the overlapping field of view enables the device 102 to capture the region of interest using multiple cameras.

FIG. 2A illustrates a typical system diagram for encoding and decoding image data as is known in the art. As illustrated in FIG. 2A, a system 200 includes a source device 202 and a remote device 204. The source device 202 may receive image data, may encode the image data using an encoder 212 to generate compressed data and may transmit the compressed data using a transmitter 214. The remote device 204 may receive the compressed data using a receiver 216, may decode the compressed data using a decoder 218 to generate decoded data and may display the decoded data using a display 220.

Figure 2B:
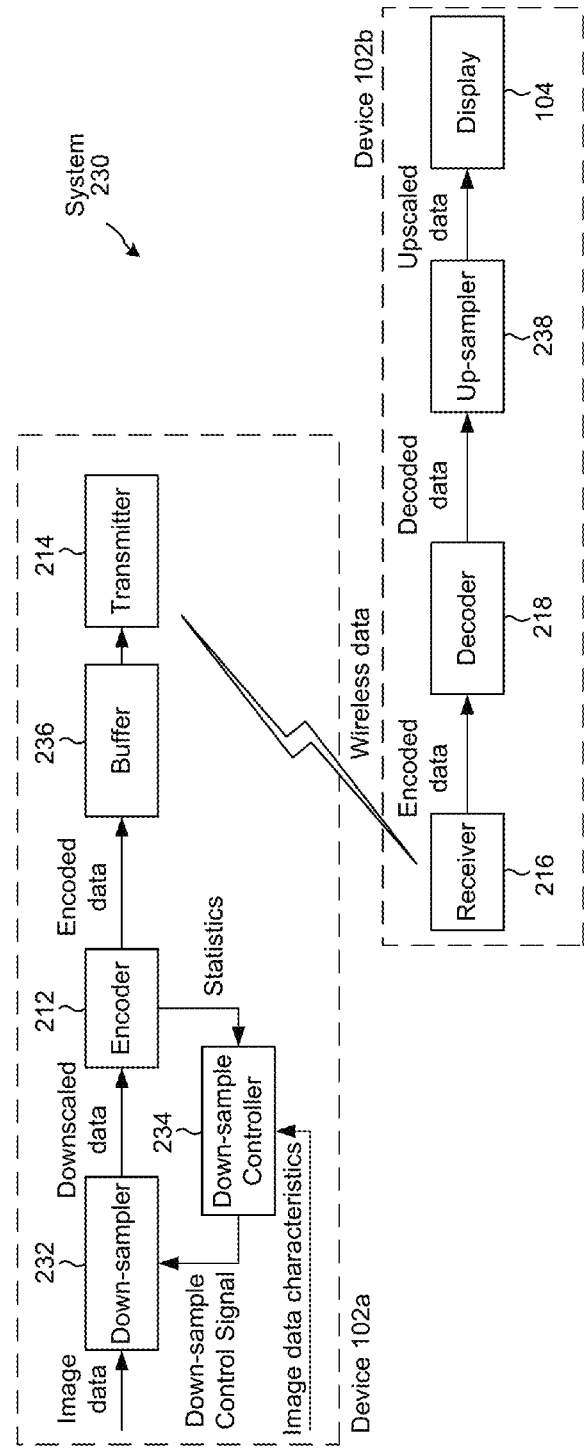

FIG. 2B illustrates an example system diagram for adaptively controlling a resolution according to embodiments of the present disclosure. As illustrated in FIG. 2B, the system 230 may include a first device 102a and a second device 102b. The first device 102a may receive image data, may downscale the image data using a down-sampler 232 to generate downscaled data, may encode the downscaled data using the encoder 212 to generate encoded data, may store the encoded data in a buffer 236 and may transmit the encoded data using the transmitter 214. An amount of downscaling performed by the down-sampler 232 may be controlled by a down-sample control signal generated by a down-sample controller 234. To determine the amount of downscaling to perform on the image data, the down-sample controller 234 may receive image data characteristics from external to the first device 102a and/or statistics from the encoder 212.

While FIG. 2B illustrates the down-sample controller 234 receiving feedback from the encoder 212 to determine the amount of downscaling to perform, the present disclosure is not limited thereto. Instead, the down-sample controller 234 may be located before the down-sampler 232 and may determine the amount of downscaling using the image data characteristics, for example by analyzing the image data, without feedback from the encoder 212 or other components. To illustrate the difference, using a non-feedback path the down-sample controller 234 may determine to down-sample the image data for current image data based on the current image data, whereas using a feedback path the down-sample controller 234 may determine to down-sample the image data for current image data based on previous image data and/or current image data.

The second device 102b may receive the encoded data using the receiver 216, decode the encoded data using the decoder 218 to generate decoded data, upscale the decoded data using an up-sampler 238 to generate upscaled data and may display the upscaled data on the display 104. The up-sampler 238 may determine an amount of upscaling required to increase a resolution of the decoded data so that the upscaled data matches the original image data.

Figure 2C:
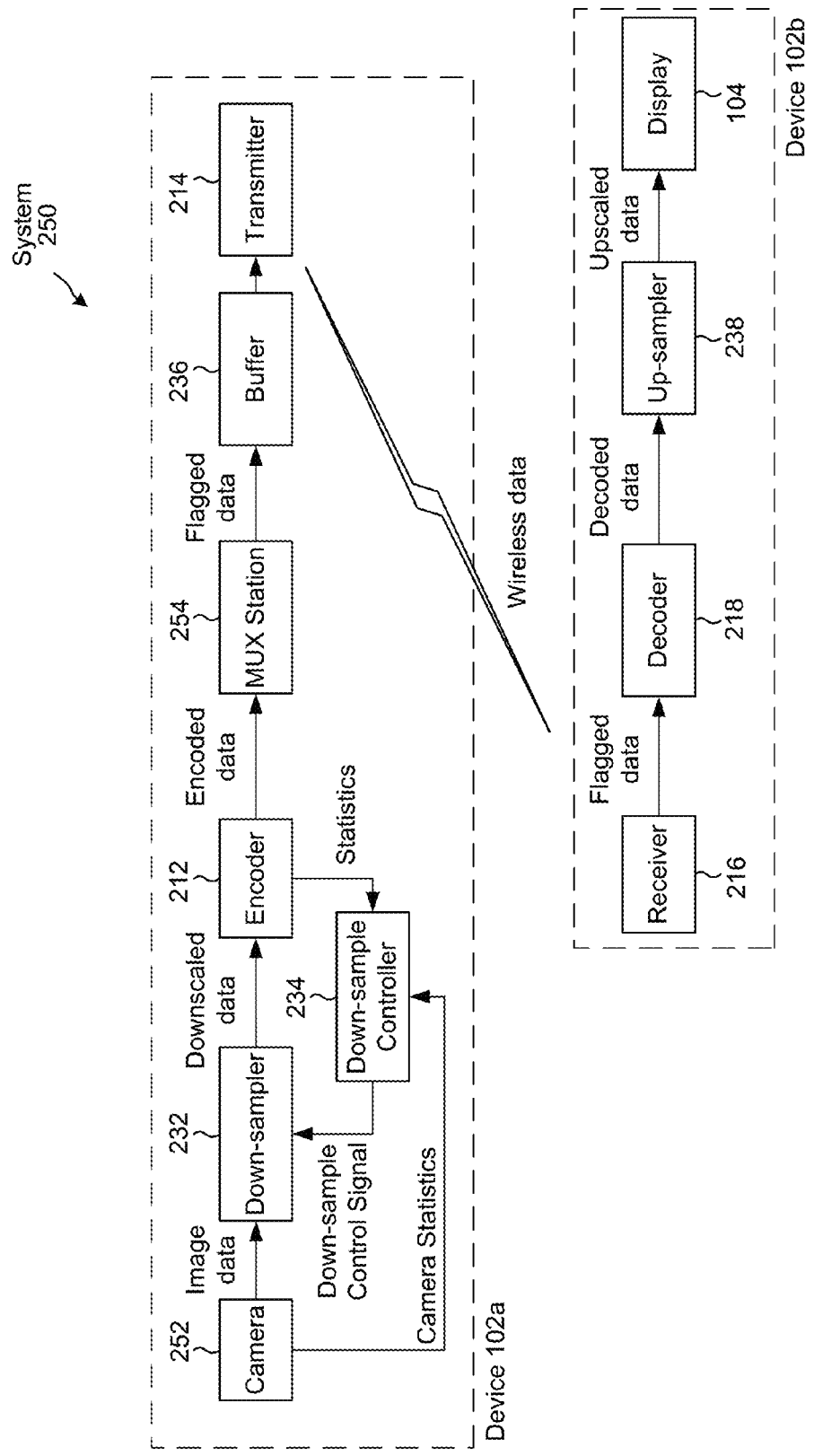

FIG. 2C illustrates an example system diagram for adaptively controlling a resolution according to embodiments of the present disclosure. As illustrated in FIG. 2C, the system 250 may include a first device 102a and a second device 102b. The first device 102a may generate image data using a camera 252, may downscale the image data using a down-sampler 232 to generate downscaled data, may encode the downscaled data using the encoder 212 to generate encoded data, may insert a flag in a header of the encoded data using a multiplexer (MUX) station 254 to generate flagged data, may store the flagged data in the buffer 236 and may transmit the flagged data using the transmitter 214. An amount of downscaling performed by the down-sampler 232 may be controlled by the down-sample control signal generated by the down-sample controller 234. To determine the amount of downscaling to perform on the image data, the down-sample controller 234 may receive camera statistics from the camera 252 and/or statistics from the encoder 212.

While FIG. 2C illustrates the down-sample controller 234 receiving feedback from the encoder 212 to determine the amount of downscaling to perform, the present disclosure is not limited thereto. Instead, the down-sample controller 234 may be located before the down-sampler 232 and may determine the amount of downscaling using the camera statistics without feedback from the encoder 212 or other components. To illustrate the difference, using a non-feedback path the down-sample controller 234 may determine to down-sample the image data for current image data based on the current image data, whereas using a feedback path the down-sample controller 234 may determine to down-sample the image data for current image data based on previous image data and/or current image data.

The second device 102b may receive the flagged data using the receiver 216, decode the flagged data using the decoder 218 to generate decoded data, upscale the decoded data using the up-sampler 238 to generate upscaled data and may display the upscaled data on the display 104. In contrast to the system 230 illustrated in FIG. 2B, the up-sampler 238 in the system 250 may determine the amount of upscaling based on the flag in the header of the flagged data.

Figure 3A:

FIGS. 3A-3B illustrate examples of different compression methods including controlling a resolution according to embodiments of the present disclosure. As illustrated in FIG. 3A, original image data 310 may include a plurality of horizontal pixels and a plurality of vertical pixels for a total of 64 pixels. As an example of a lossy compression method known to one of skill in the art, the original image data 310 may be subsampled to generate compressed image data 320. As illustrated in FIG. 3A, the compressed image data 320 combines multiple pixels to compress the original image data 310 and reduce a size of the compressed image data 320 while maintaining the 64 pixel resolution of the original image data 310. While the compressed image data 320 results in a smaller size and corresponding smaller bandwidth consumption, an image quality of the compressed image data 320 may be reduced relative to the original image data 310. In contrast, the first device 102a may generate downscaled image data 330 from the original image data 310, resulting in a smaller size due to the reduced resolution to 36 pixels. In addition to resulting in a smaller size and a corresponding smaller bandwidth consumption, an image quality of the downscaled image data 330 may be visually similar relative to an image quality of the original image data 310.

To illustrate a difference in image quality, FIG. 3B illustrates original image data 312 including a plurality of pixels displaying the American flag. While a majority of compressed image data 322 (generated using lossy compression methods known to one of skill in the art) maintains an image quality relative to the original image data 312, the subsampling scheme causes compression error 324 where opposite pixel values are grouped together. In contrast, as the downscaled image data 332 has higher bits per pixel than the compressed image data 322, the downscaled image data 332 maintains an image quality relative to the original image data 312 without the compression error 324. Therefore, in addition to resulting in a smaller size and corresponding smaller bandwidth consumption, an image quality of the downscaled image data 332 may be visually similar relative to an image quality of the original image data 312.

FIG. 4 is a flowchart conceptually illustrating an example method for downscaling and encoding image data according to embodiments of the present disclosure. As illustrated in FIG. 4, the first device 102a may receive (410) image data, receive (412) image data characteristics, determine (414) to down-sample the image data, determine (416) an amount of down-sampling, down-sample (418) the image data to generate downscaled data, encode (420) the downscaled data to generate encoded data, buffer (422) the encoded data and transmit (424) the encoded data to the second device 102b.

As discussed in greater detail above with regard to step 122, the device 102 may determine whether to down-sample the image data based on only a portion of the image data. For example, the device 102 may determine a Region of Interest (ROI) within the image data, such as a face, person, object or the like, and may determine to down-sample the image data based on the ROI. In addition, as discussed in greater detail above, a frame rate associated with the image data may be increased and/or decreased during down-sampling.

As discussed above with regard to FIG. 1, the image data characteristics (e.g., metric values) may include a quantization parameter (QP), camera statistics, a digital gain associated with a camera sensor, statistics associated with the image data, noise level statistics or the like. For example, the first device 102a may determine a complexity of the image data, such as if the image data includes high frequency signals, high noise levels or other complex information. If the complexity of the image data is high, the first device 102 may determine not to down-sample the image data or may reduce the amount of down-sampling relative to less complex image data to prevent image degradation.

Figure 5:
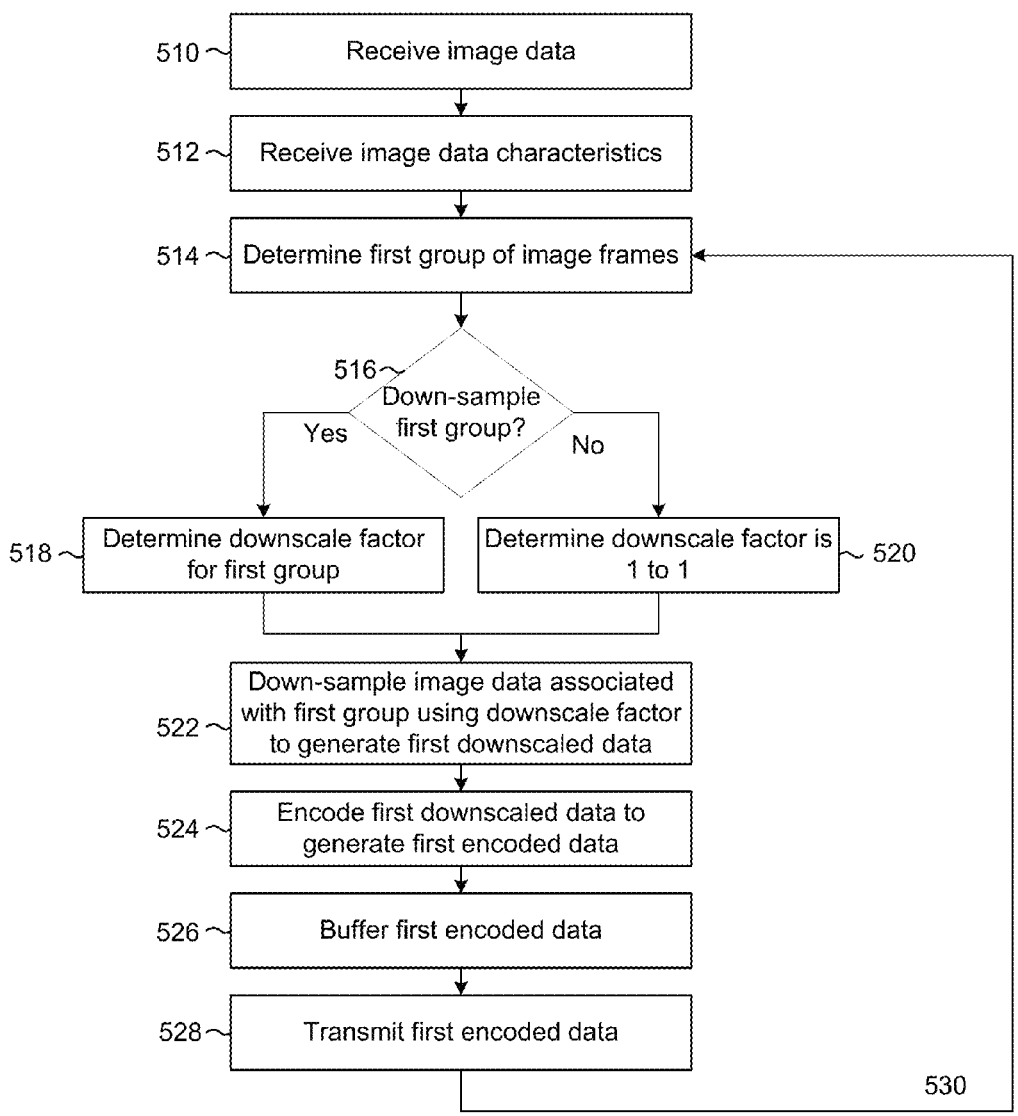
FIG. 5 is a flowchart conceptually illustrating an example method for adaptively downscaling and encoding a group of image frames according to embodiments of the present disclosure.

FIG. 5 is a flowchart conceptually illustrating an example method for adaptively downscaling and encoding a group of image frames according to embodiments of the present disclosure. As illustrated in FIG. 5, the first device 102a may receive (510) image data, may receive (512) image data characteristics and may determine (514) a first group of image frames from the image data. For example, the first device 102a may determine that the first group of image frames have a similar level of complexity and therefore should be downscaled similarly.

The first device 102a may determine (516) whether to down-sample the first group of image frames. For example, the first device 102a may analyze the image data characteristics to determine if the image data includes complex information and would therefore suffer image degradation as a result of downscaling. As discussed in greater detail above, the device 102 may determine whether to down-sample the first group of image frames based on only a portion of the first group of image frames. For example, the device 102 may determine a Region of Interest (ROI) within image data associated with each of the first group of image frames, such as a face, person, object or the like, and may determine to down-sample the first group of image frames based on the ROI.

If the first device 102a determines that the first group of images should be downsampled (e.g., the first group of images are less complex and will therefore not suffer image degradation), the first device 102a may determine (518) a downscale factor for the first group. For example, the first device 102a may determine the downscale factor for the first group based on the image data characteristics (e.g., increase the downscale factor the less complex the image data).

Alternatively, the first device 102 may determine (520) that the downscale factor is 1 to 1 (e.g., the first group of image frames will not be downscaled.

The first device 102a may down-sample (522) image data associated with the first group using the downscale factor to generate the first downscaled data. For example, the first device 102a may determine that the downscale factor is 2:1 in step 518, and therefore the first device 102a may generate the first downscaled data at half resolution compared to the image data. Alternatively, the first device 102 may determine that the downscale factor is 1:1 in step 520 and therefore the first device 102 may generate the first downscaled data at full resolution compared to the image data.

The first device 102a may encode (524) the first downscaled data to generate first encoded data, may buffer (526) the first encoded data and may transmit (528) the first encoded data to the second device 102b. The first device 102a may then loop 530 back to step 514 and repeat steps 514-28 for a subsequent group of image frames.

FIGS. 6A-6H are flowcharts conceptually illustrating example methods for determining to downscale image data according to embodiments of the present disclosure. While not explicitly illustrated in FIGS. 6A-6H, as discussed above the device 102 may determine whether to down-sample the image data based on only a portion of the image data. For example, the device 102 may determine a Region of Interest (ROI) within the image data, such as a face, person, object or the like, and may determine to down-sample the image data based on the ROI. In addition, thresholds illustrated in FIGS. 6A-6H may be determined using machine learning. For example, the device 102 may collect image data that has been categorized as "good" image quality or "bad" image quality and may compare metrics associated with the "good" image data and the "bad" image data to determine the threshold.

Figure 6A:
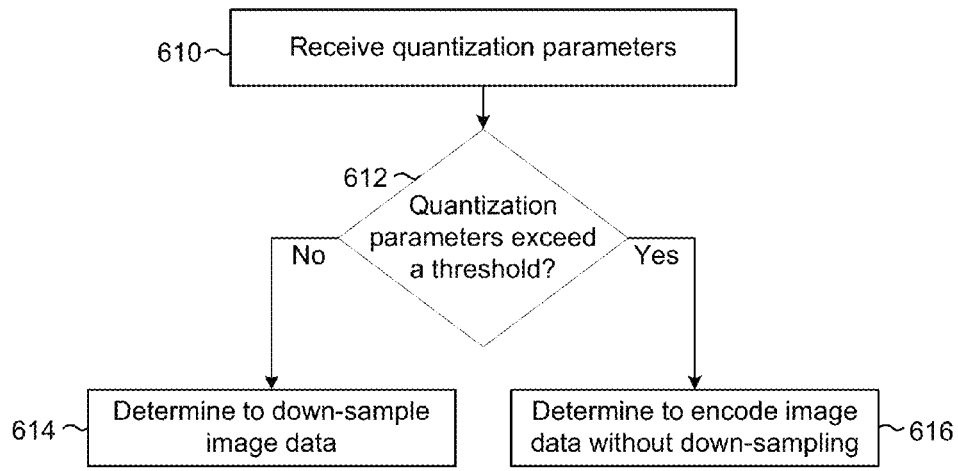

As illustrated in FIG. 6A, the first device 102a may receive (610) quantization parameters and determine (612) whether the quantization parameters exceed a threshold. If the quantization parameters do not exceed the threshold, the first device 102a may determine (614) to down-sample the image data. If the quantization parameters do exceed the threshold, the first device 102a may determine (616) to encode the image data without down-sampling.

Figure 6B:
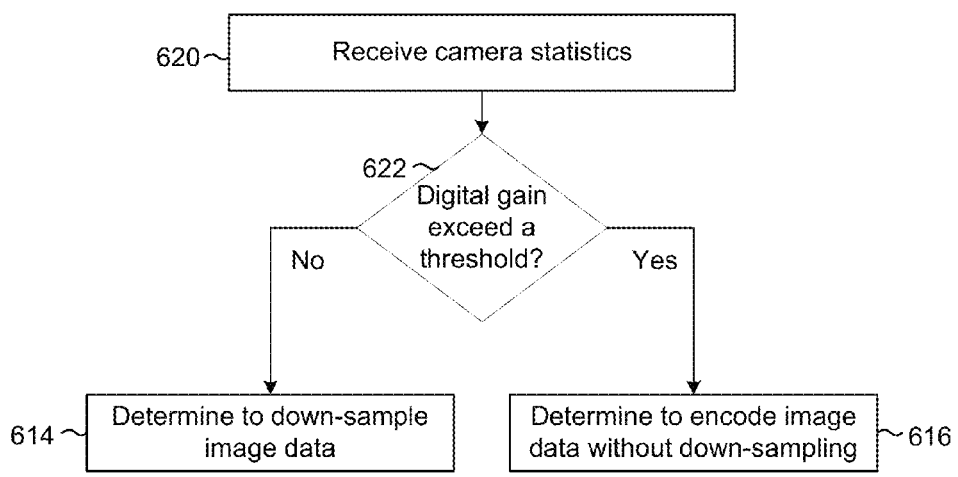

As illustrated in FIG. 6B, the first device 102a may receive (620) camera statistics and determine (622) whether a digital gain associated with the camera sensor exceeds a threshold. If the digital gain does not exceed the threshold, the first device 102a may determine (614) to down-sample the image data. If the digital gain does exceed the threshold, the first device 102a may determine (616) to encode the image data without down-sampling.

As illustrated in FIG. 6C, the first device 102a may determine (630) statistics associated with the image data and determine (632) whether the image data includes natural image data. For example, lossy methods are suitable for natural image data such as photographs in applications where minor (sometimes imperceptible) loss of fidelity is acceptable to achieve a substantial reduction in bit rate. If the image data includes natural image data, the first device 102a may determine (614) to down-sample the image data. If the image data does not include natural image data, the first device 102a may determine (616) to encode the image data without down-sampling.

As illustrated in FIG. 6D, the first device 102a may receive (640) image data, may down-sample (642) the image data to generate downscaled image data, may up-sample (644) the downscaled image data to generate upscaled image data and may determine (646) differences between the upscaled image data to the original image data. For example, the differences may be determined using a Structural Similarity (SSIM) index, which is a method for measuring the similarity between two images, multiscale SSIM or the like. Additionally or alternatively, the differences may be determined based on peak signal-to-noise ratio (PSNR), mean squared error (MSE) or the like. The first device 102 may determine (648) whether image degradation exceeds a threshold. If the image degradation does not exceed the threshold, the first device 102a may determine (614) to down-sample the image data. If the image degradation does exceed the threshold, the first device 102a may determine (616) to encode the image data without down-sampling. As discussed in greater detail above with regard to step 122, the device 102 may determine whether to down-sample the image data based on only a portion of the image data. For example, the device 102 may determine a Region of Interest (ROI) within the image data, such as a face, person, object or the like, and may determine to down-sample the image data based on the ROI.

Figure 6E:
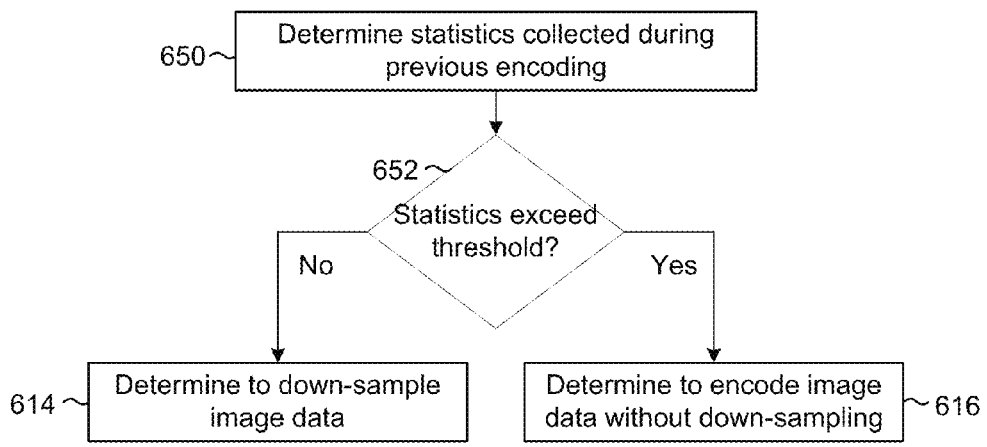

As illustrated in FIG. 6E, the first device 102a may determine (650) statistics collected during previous encoding and determine (652) whether the statistics exceed a threshold. If the statistics do not exceed the threshold, the first device 102a may determine (614) to down-sample the image data. If the statistics do exceed the threshold, the first device 102a may determine (616) to encode the image data without down-sampling.

Figure 6F:
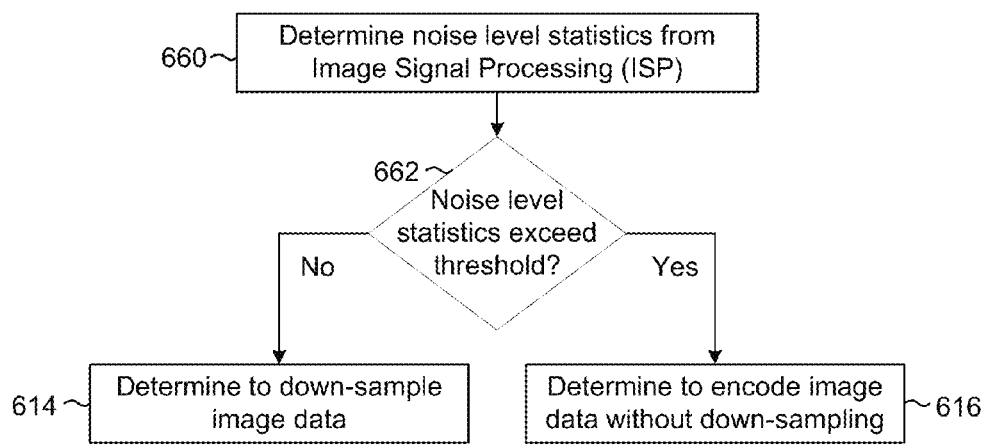

As illustrated in FIG. 6F, the first device 102a may determine (660) noise level statistics from Image Signal Processing (ISP) and determine (662) whether noise level statistics exceed a threshold. If the noise level statistics do not exceed the threshold, the first device 102a may determine (614) to down-sample the image data. If the noise level statistics do exceed the threshold, the first device 102a may determine (616) to encode the image data without down-sampling.

Figure 6G:
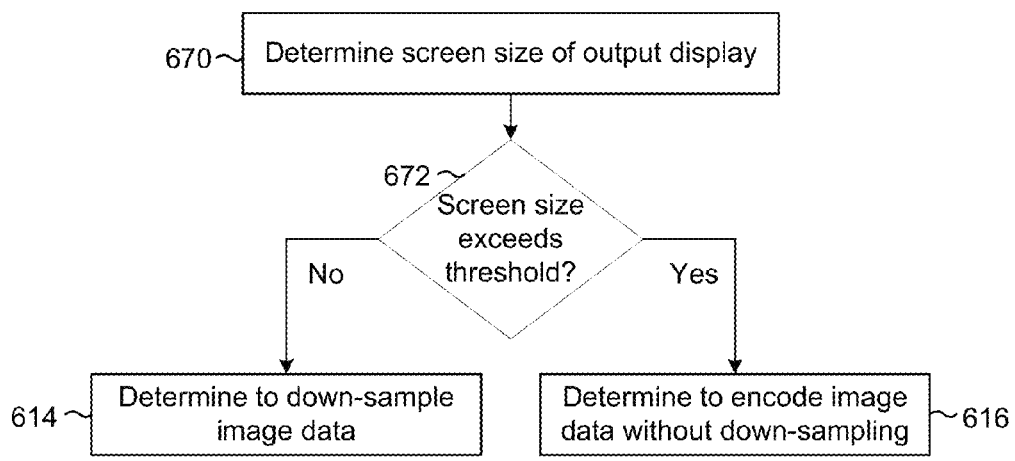

As illustrated in FIG. 6G, the first device 102a may determine (670) a screen size of an output display. For example, the first device 102a may determine the screen size based on user input, system settings or the like. The first device 102a may determine (672) whether the screen size exceeds a threshold. If the screen size does not exceed the threshold, the first device 102a may determine (614) to down-sample the image data. If the screen size does exceed the threshold, the first device 102a may determine (616) to encode the image data without down-sampling.

Figure 6H:
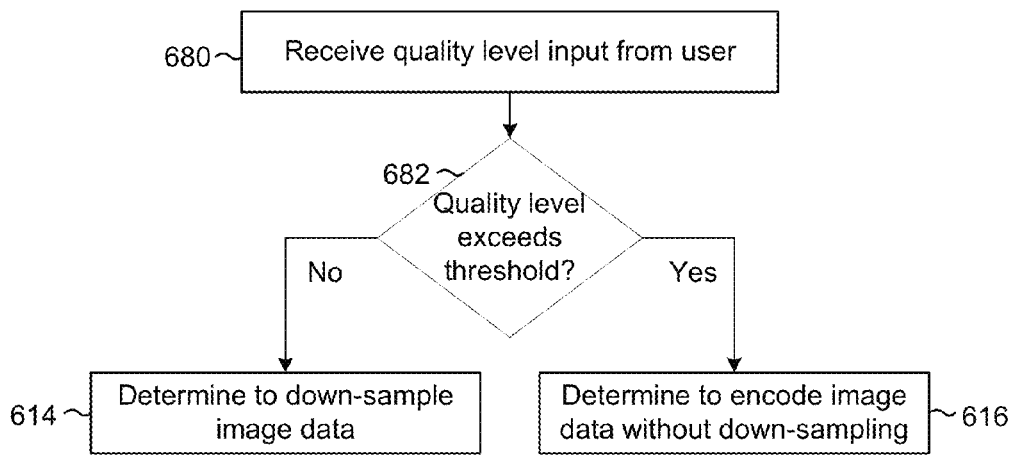

As illustrated in FIG. 6H, the first device 102a may receive (680) quality level input from a user of the first device 102a. For example, the user may input to the first device 102a that the quality level should be high, medium, low or the like. The first device 102a may determine (682) whether the quality level exceeds a threshold. If the quality level does not exceed the threshold, the first device 102a may determine (614) to down-sample the image data. If the quality level exceeds the threshold, the first device 102a may determine (616) to encode the image data without down-sampling.

Figure 7:
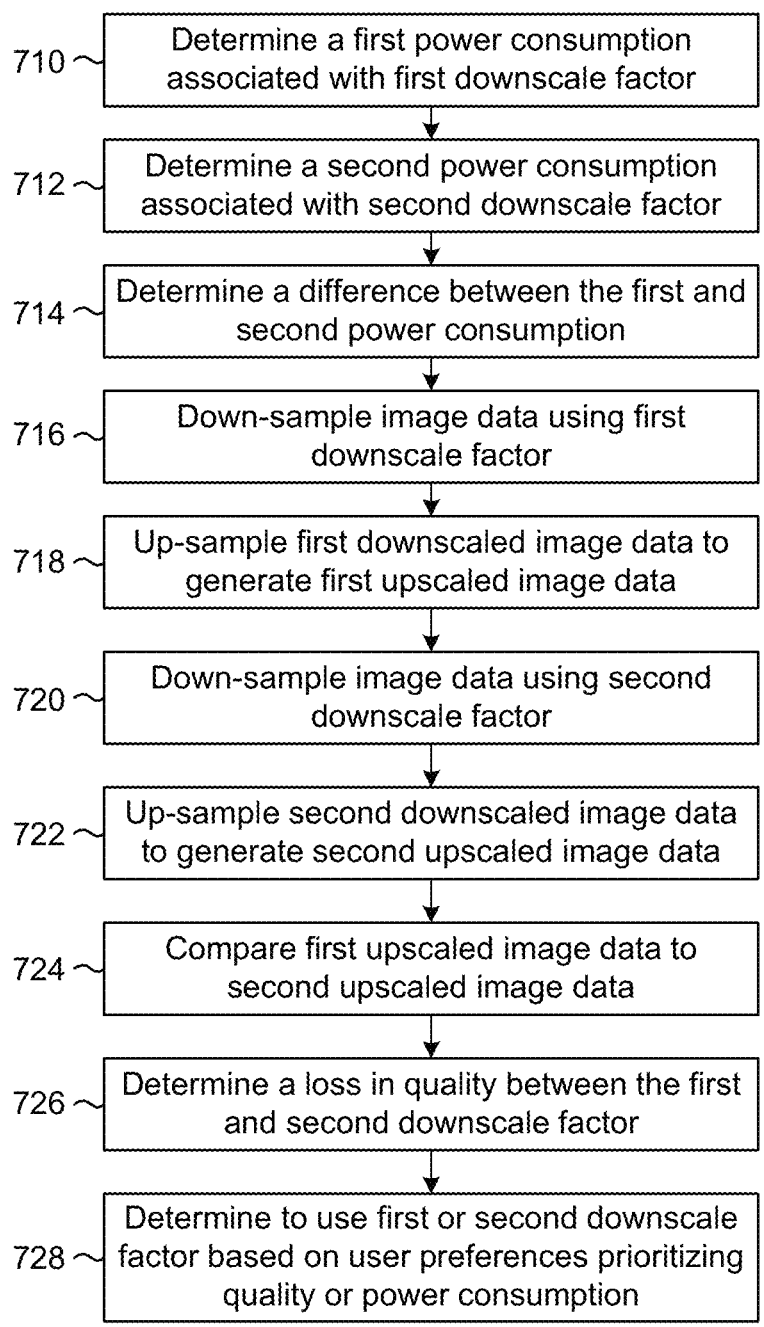
FIG. 7 is a flowchart conceptually illustrating an example method for determining a downscale factor according to embodiments of the present disclosure.

FIG. 7 is a flowchart conceptually illustrating an example method for determining a downscale factor according to embodiments of the present disclosure. As illustrated in FIG. 7, the first device 102 may determine (710) a first power consumption associated with a first downscale factor, determine (712) a second power consumption associated with a second downscale factor and determine (714) a difference between the first and second power consumption. For example, the first device 102a may determine that the second downscale factor results in a 20% savings in power consumption. The device 102 may determine the first power consumption and/or the second power consumption either directly or by approximation. For example, the device 102 may use hardware to measure the power consumption or may use software to approximate the power consumption using an approximation model.

The first device 102a may down-sample (716) image data using the first downscale factor to generate first downscaled image data and up-sample (718) the first downscaled image data to generate first upscaled image data. The first device 102a may down-sample (720) the image data using the second downscale factor to generate second downscaled image data and up-sample (722) the second downscaled image data to generate second upscaled image data. The first device 102a may then compare (724) the first upscaled image data to the second upscaled image data and determine (726) a loss in quality between the first downscale factor and the second downscale factor.

The first device 102a may then determine (728) to use the first or second downscale factor based on user preferences prioritizing quality or power consumption. For example, first user preferences may prioritize power consumption at the cost of image quality and may select the second downscale factor due to the 20% savings in power consumption, while second user preferences may prioritize image quality at the cost of power consumption and may select the first downscale factor due to the differences between the first upscaled image data and the second upscaled image data.

Various machine learning techniques may be used to determine an appropriate downscale factor to reduce power consumption while maintaining image quality. Further, machine learning techniques may be used to train a model to determine when and how much to downscale an image based on image data characteristics or other factors detected by a system at runtime. In addition, machine learning techniques may be used to train a model to determine thresholds associated with metrics corresponding to image quality. Such models may be used to make determinations discussed in FIGS. 4-7. Such machine learning techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used during training. For example, experimental results identifying a difference in image quality and a difference in power consumption may be used as "ground truth" for the training examples.

As discussed in greater detail above, FIGS. 4-7 illustrate flowcharts conceptually illustrating example methods for controlling a resolution by the first device 102a. For example, the first device 102a may determine to downscale image data and may downscale different image data using different downscale factors. Thus, the first device 102a determines the downscale factor and therefore has the downscale factor to perform the downscaling of the image data. However, the second device 102b needs to determine the downscale factor used by the first device 102a in order to upscale the downscaled image data prior to displaying the image data. Therefore, the second device 102b needs to determine that the received image data was downscaled originally and to determine the downscale factor applied to the received image data. FIGS. 8-10B illustrate examples of different ways that the first device 102a may telegraph that the image data was downscaled originally and the downscale factor applied so that the second device 102b can upscale the image data correctly.

Videos may be stored as video data including individual video frames (i.e., image data). To compress the video data, a video frame may be compressed using different algorithms. The algorithms for video frames are called picture types or frame types, and three major picture types used in video algorithms are known as "Intra-coded picture" (I-frame), "Predicted picture" (P-frame) and "Bi-predictive picture" (B-frame). An I-frame is a fully specified picture such as a conventional static image file and therefore consumes more space, whereas P-frame and B-frames only include part of the image information and need to be interpreted using adjoining video frames. For example, a P-frame includes only the changes in the image data from the previous video frame (e.g., only pixels associated with movements or changes are included, and the unchanging pixels are not stored in the P-frame) and a B-frame uses differences between the current frame and both the preceding and following frames to specify its content. In order to telegraph to the second device 102b that the image data was downscaled and/or the downscale factor applied to the image data, the first device 102a may embed information in the I-frames and generate a new I-frame whenever the downscale factor changes.

Figure 8:
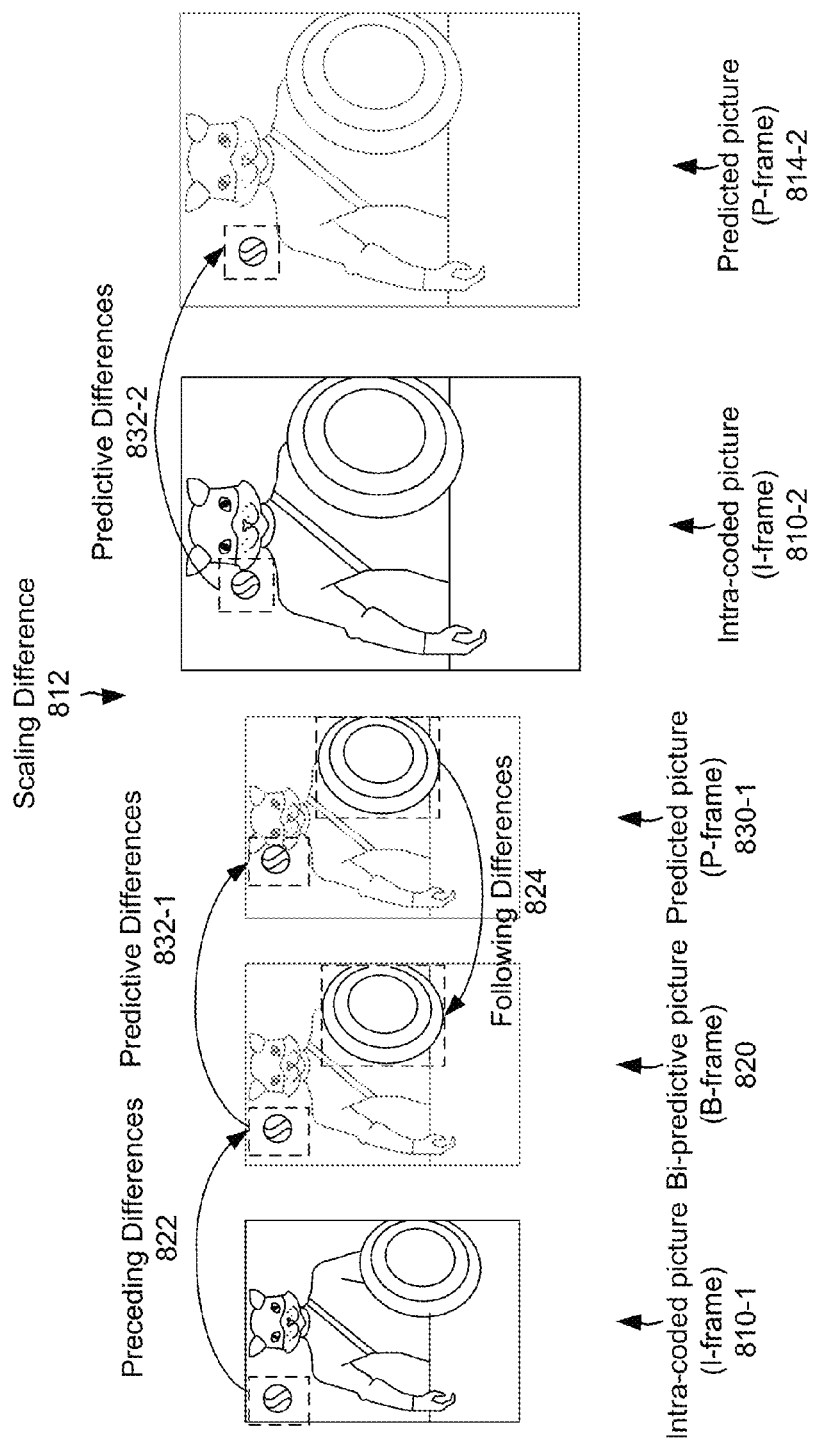
FIG. 8 is an example of adaptively controlling a resolution using intra-coded pictures according to embodiments of the present disclosure.

FIG. 8 illustrates several video frames compressed using the different algorithms described above. For example, FIG. 8 illustrates a first I-frame 810-1 followed by a B-frame 820 and a first P-frame 830-1. As illustrated in FIG. 8, the B-frame 820 may include information associated with Preceding Differences 822 (between the B-frame and the preceding frame) and Following Differences 824 (between the B-frame and the following frame). Similarly, the first P-frame 830-1 may include information associated with first Predictive Differences 832-1 (between the P-frame and the preceding frame). The first P-frame 830-1 is followed by a second I-frame 810-2, which is followed by a second P-frame 814-2. As discussed above, the second P-frame 830-2 may include information associated with second Predictive Differences 832-2 and may not include pixels that are identical to pixels in the second I-frame 810-2.

Using the discussed algorithms (e.g., I-frame, P-frame and B-frame), a video encoder may compress video data by removing redundant data. A group of pictures (GOP) begins with an I-frame and extends until a subsequent I-frame. For example, the first I-frame 810-1, B-frame 820 and first P-frame 830-1 are a first GOP while the second I-frame 810-2 and the second P-frame 830-2 are a second GOP. To embed information associated with the downscaling into the video data, the first device 102a may generate a new I-frame whenever the downscale factor changes and may use the same downscale factor for each frame within the GOP. Thus, the first GOP has reduced dimensions relative to the second GOP as illustrated by Scaling Difference 812 in FIG. 8. The downscale factor and any other changes (e.g., resolution frame rate or the like) associated with the second GOP may be included in the second I-frame 810-2.

FIG. 9A is a flowchart conceptually illustrating an example method for the first device 102a to control a resolution and insert an I-frame corresponding to a change in resolution. As illustrated in FIG. 9A, the first device 102a may receive (910) image data, such as video data, may receive (912) quantization parameters associated with the image data and may determine (914) a change in the quantization parameters between individual frames of the image data exceeds a threshold.

For example, the image data may include a first group of pictures within a first range of quantization parameters followed by a second group of pictures within a second range of quantization parameters. As each of the first group of pictures are within the first range, the first device 102a may treat the first group of pictures similarly and downscale each of the first group of pictures using a first downscale factor or first aspect ratio. Similarly, as each of the second group of pictures are within the second range, the first device 102a may treat the second group of pictures similarly and downscale each of the second group of pictures using a second downscale factor or second aspect ratio. However, the first device 102a may detect a change from the first range of quantization parameters to the second range of quantization parameters and that the change exceeds the threshold. Thus, the first frame of the second group of pictures may be used to indicate that a change in quantization parameters (and therefore a change in the downscale factor or the aspect ratio) has occurred.

The first device 102a may then determine (916) if the quantization parameters have increased from the first range of quantization parameters to the second range of quantization parameters. If the quantization parameters have not increased, the first device 102a may insert (918) an I-frame with a lower aspect ratio (e.g., downscaling more). If the quantization parameters have increased, the first device 102a may insert (920) an I-frame with a higher aspect ratio (e.g., downscaling less). The downscale factor and any other changes (e.g., resolution frame rate or the like) may be included in the I-frame. The first device 102a may then down-sample (922) the image data using a current aspect ratio to generate first downscaled data, encode (924) the first downscaled data to generate first encoded data, buffer (926) the first encoded data, transmit (928) the first encoded data and then loop (930) to step 914.

On the receiving end, the second device 102b may receive (950) the first encoded data, may determine (952) a current frame within the first encoded data and may determine (954) if the current frame is an I-frame. If the current frame is an I-frame, the second device 102b may determine (956) an aspect ratio of the I-frame and may set (958) the aspect ratio as a current aspect ratio. After setting the current aspect ratio in step 958, or if the current frame is not an I-frame, the second device 102b may decode (960) the current frame to generate a decoded frame, may up-sample (962) the decoded frame using the current aspect ratio to generate an upscaled frame, may display (964) the upscaled frame and may loop 966 to step 952.

Figure 9B:
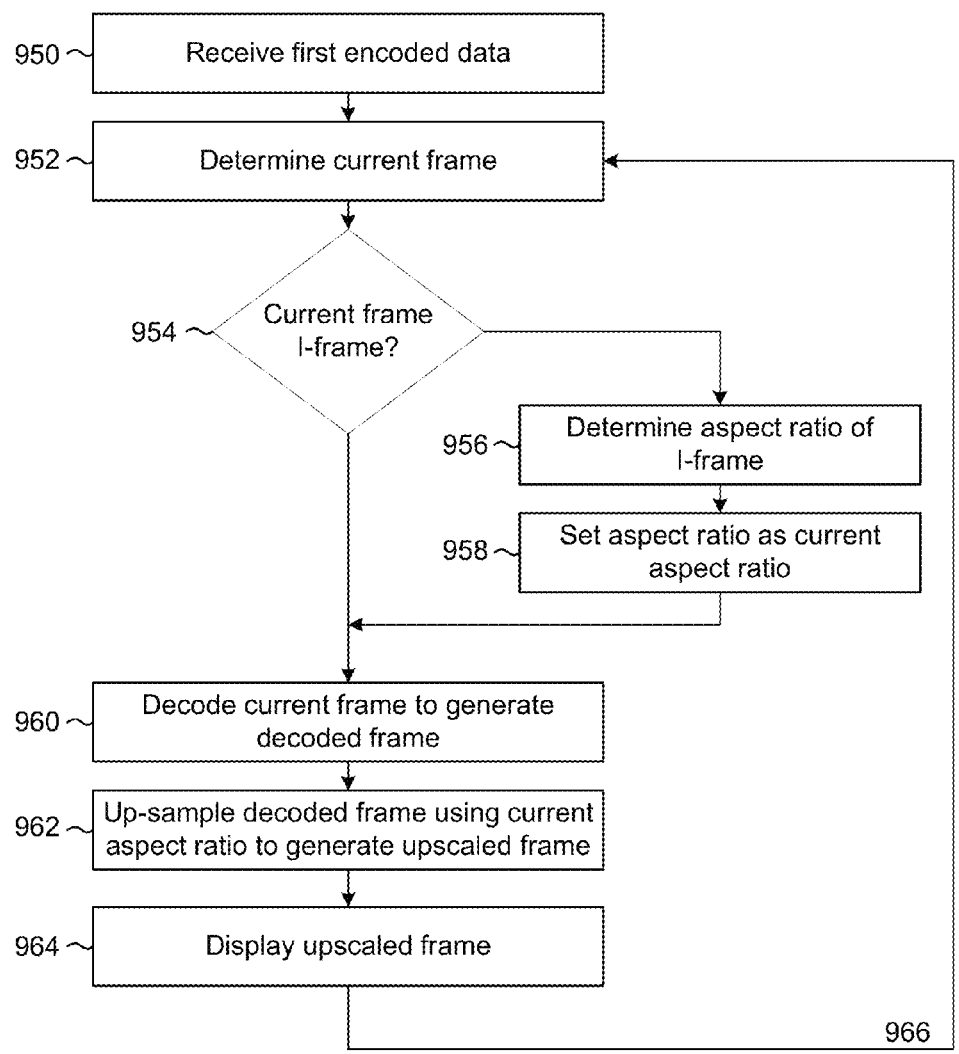
Figure 10A:
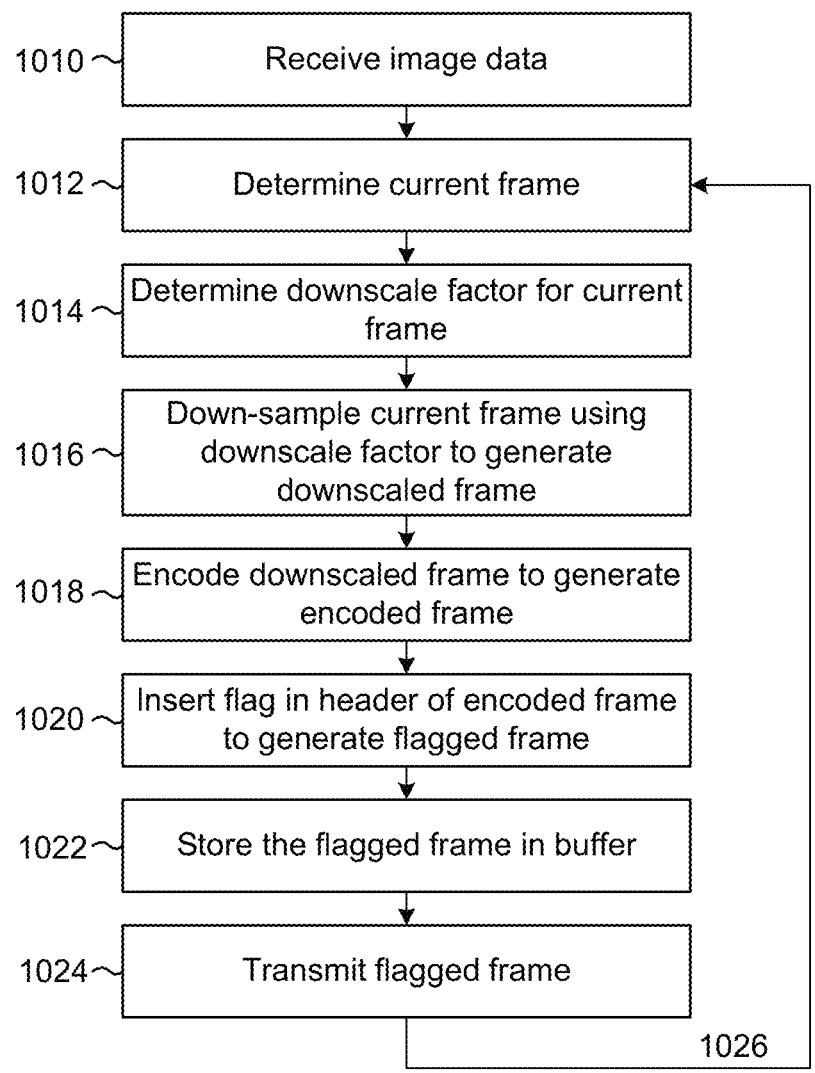
FIGS. 10A-10B are flowcharts conceptually illustrating example methods for controlling a resolution by inserting a flag in a header of image data according to embodiments of the present disclosure.
Figure 10B:
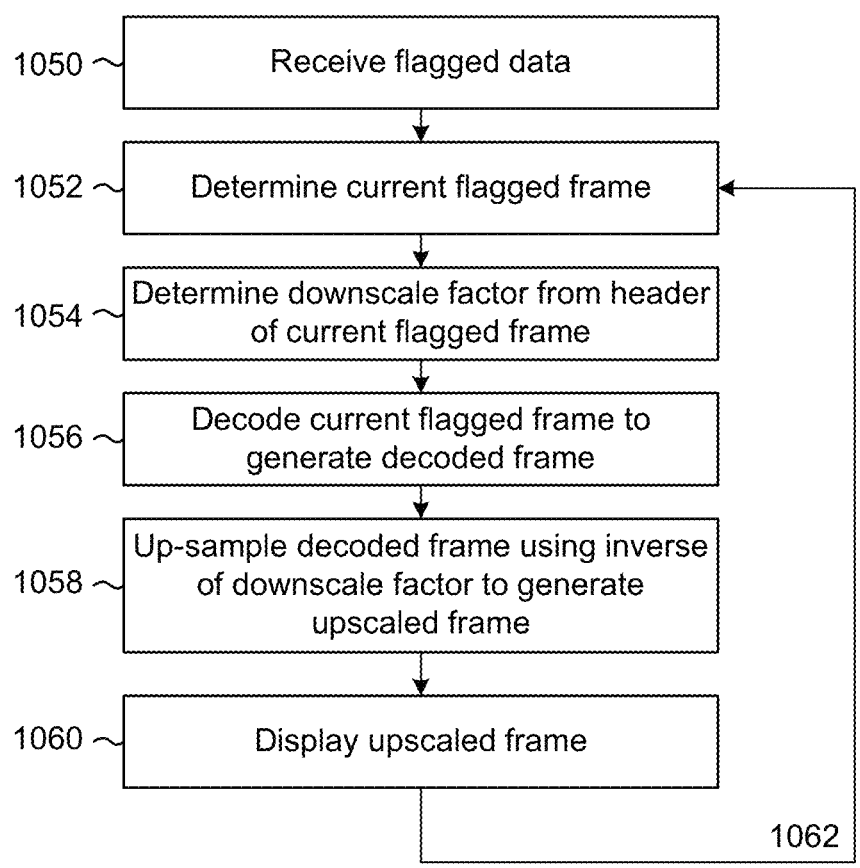

FIGS. 9A-9B illustrate an example of down-sampling and up-sampling using a standard video player or the like. Typically, down-sampling may be identical for each image frame included in a group of pictures (GOP). However, the present disclosure is not limited thereto. Instead, using a non-standard video player (e.g., a new syntax, container or the like) the device 102 may change the down-sampling on a per-frame basis, such that each image frame is down-sampled individually and unique down-sampling values are embedded in each image frame. As illustrated in FIGS. 10A-10B, one example of embedding the down-sampling values is by inserting the down-sampling values in a header associated with the image data.

FIGS. 10A-10B are flowcharts conceptually illustrating example methods for controlling a resolution by inserting a flag in a header of image data according to embodiments of the present disclosure. As illustrated in FIG. 10A, the first device 102a may receive (1010) image data, may determine (1012) a current frame and may determine (1014) a downscale factor for the current frame. The first device 102a may then down-sample (1016) the current frame using the downscale factor to generate a downscaled frame and may encode (1018) the downscaled frame to generate an encoded frame. The first device 102a may then insert (1020) a flag in a header of the encoded frame to generate a flagged frame, store (1022) the flagged frame in a buffer, transmit (1024) the flagged frame to the second device 102b and loop (1026) to step 1012.

The first device 102a may insert the flag in the header of the encoded frame using a multiplexer. The flag may be a single bit in the header and may indicate that the current frame was downscaled. In some examples, the flag may be set whenever a change in an amount of downscaling occurs, similar to the I-frames discussed above with regard to FIG. 9A-9B. In other examples, the flag may identify the downscaling factor, aspect ratio or the like associated with the current frame. The flag may be inserted into a header for every frame, so that the second device 102b may determine whether the current frame was downscaled without requiring additional information from other frames, or the flag may be inserted when a change in the amount of downscaling occurs.

The second device 102b may receive (1050) the flagged data, may determine (1052) the current flagged frame, may determine (1054) the downscale factor from the header of the current flagged frame, may decode (1056) the current flagged frame to generate a decoded frame, may up-sample (1058) the decoded frame using an inverse of the downscale factor to generate an upscaled frame, may display (1060) the upscaled frame and may loop (1062) to step 1052.

Figure 11A:
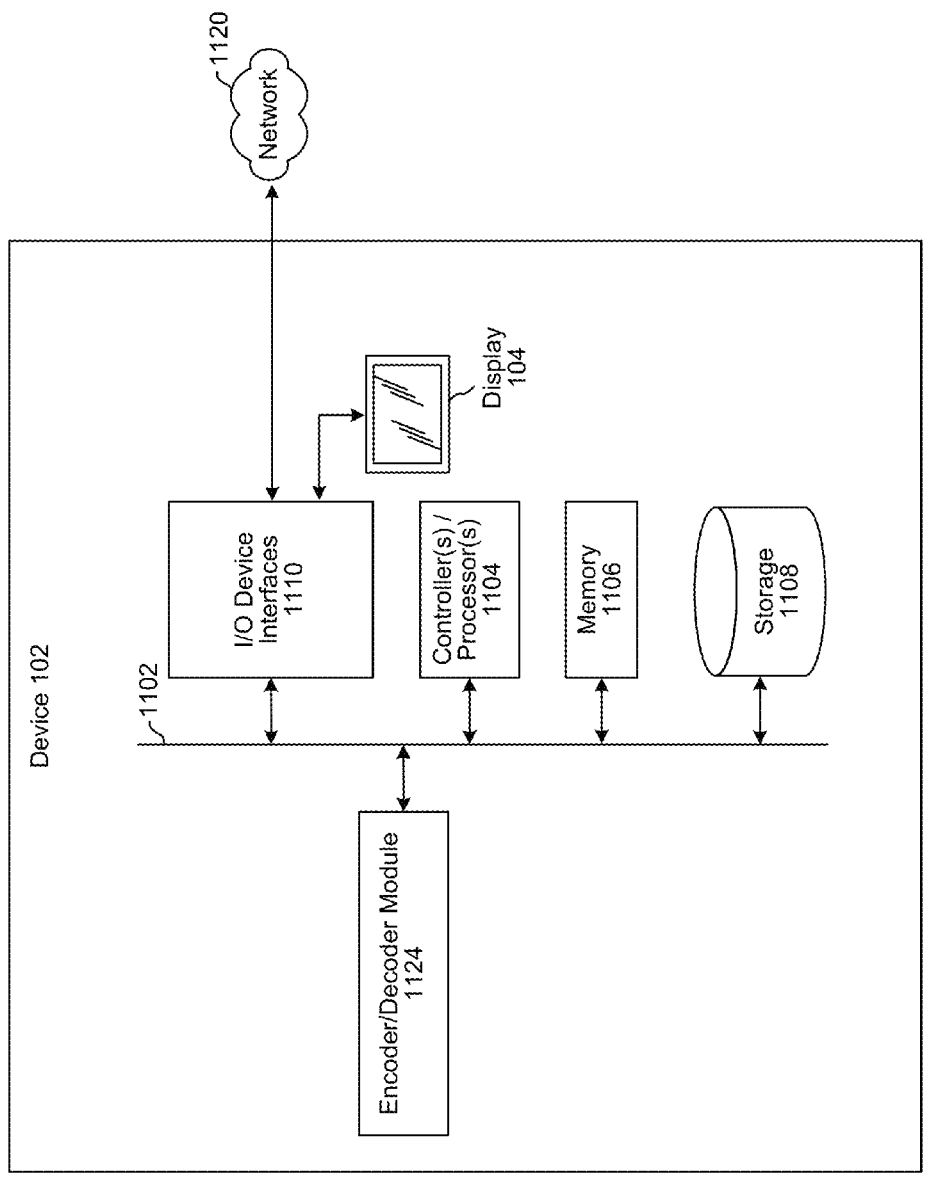
FIGS. 11A-11B are block diagrams conceptually illustrating example components of a system according to embodiments of the present disclosure.
Figure 11B:
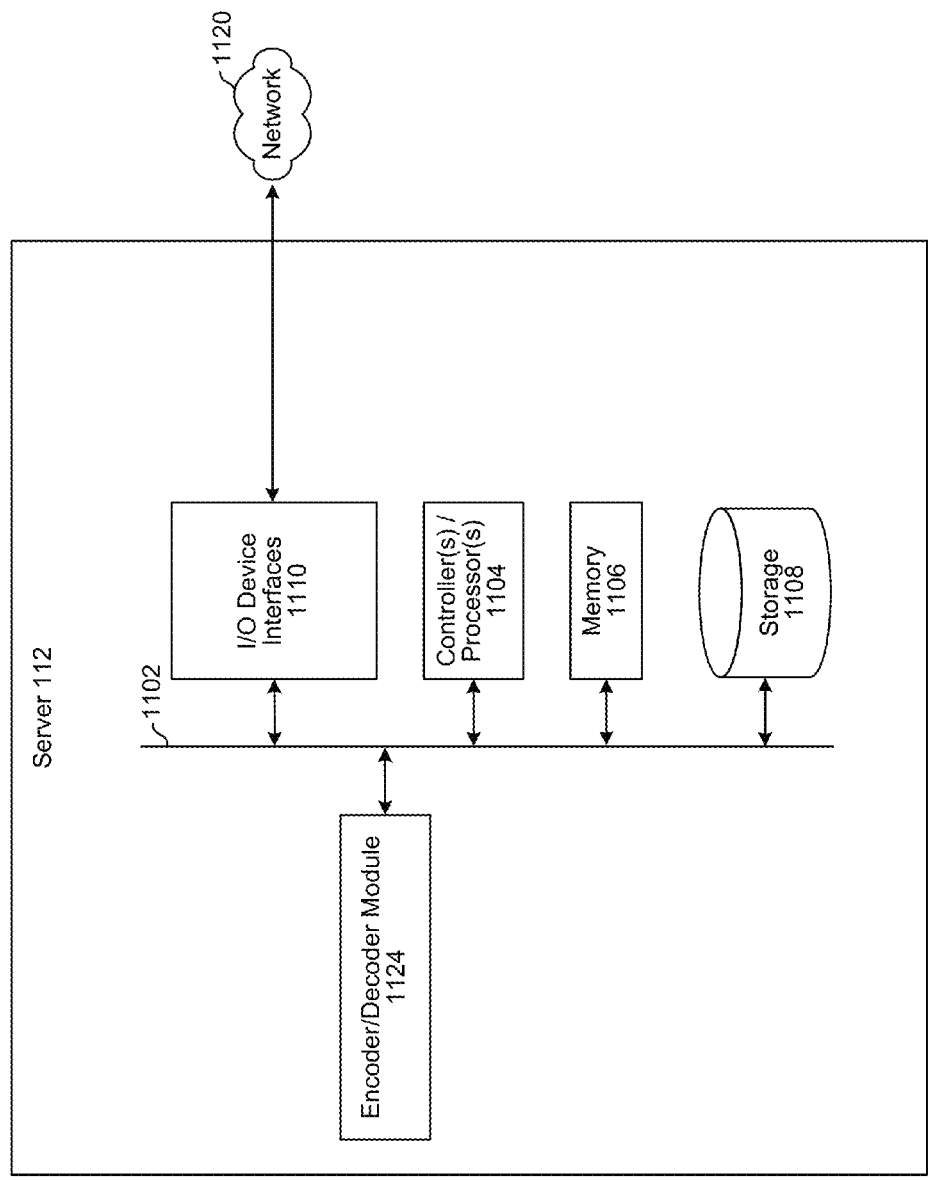

FIGS. 11A and 11B illustrate block diagrams conceptually illustrating example components of a system including one or more of a computing device 102 and a server 112. Depending upon how the system is structured, some of the components illustrated in FIG. 11A as part of the device 102 or in FIG. 11B as part of the remote server 112 may be included only in the device 102 or in the server 112, or may be distributed across multiple devices 102 and/or servers 112. Other components not illustrated may also be included in the device 102 and/or the server 112. In operation, the system may include computer-readable and computer-executable instructions that reside in storage 1108 on the device 102 and/or server 112. The device 102 may be an electronic device capable of displaying images. Examples of electronic devices may include computers (e.g., a desktop, a laptop, a server or the like), portable devices (e.g., an electronic reader, smart phone, tablet, smart watch or the like) or the like. The device 102 may also be a component of any of the abovementioned devices or systems. The server 112 may be a single server or a group of servers.

As illustrated in FIGS. 11A-11B, the device 102 and/or the sever 112 may include an address/data bus 1102 for conveying data among components of the computing device 102 and/or server 112. Each component within the computing device 102 and/or server 112 may also be directly connected to other components in addition to (or instead of) being connected to other components across the bus 1102.

The computing device 102 and/or server 112 may include one or more controllers/processors 1104 comprising one-or-more central processing units (CPUs) for processing data and computer-readable instructions and a memory 1106 for storing data and instructions. The memory 1106 may include volatile random access memory (RAM), non-volatile read only memory (ROM), non-volatile magnetoresistive (MRAM) and/or other types of memory. The device 102 and/or server 112 may also include a data storage component 1108 for storing data and processor-executable instructions. The data storage component 1108 may include one or more non-volatile storage types such as magnetic storage, optical storage, solid-state storage, etc. The device 102 and/or server 112 may also be connected to a removable or external non-volatile memory and/or storage (such as a removable memory card, memory key drive, networked storage, etc.) through the input/output device interfaces 1110. The input/output device interfaces 1110 may be configured to operate with a network 1120, for example a wireless local area network (WLAN) (such as WiFi), Bluetooth, zigbee and/or wireless networks, such as a Long Term Evolution (LTE) network, WiMAX network, 3G network, etc. The network 1120 may include a local or private network or may include a wide network such as the internet. Devices may be connected to the network 1120 through either wired or wireless connections.

The device 102 includes input/output device interfaces 1110. A variety of components may be connected to the device 102 and/or server 112 through the input/output device interfaces 1110, such as the display 104. However, the disclosure is not limited thereto and the device 102 may not include an integrated display 104. Thus, the display 104 and/or other components may be integrated into the device 102 or may be separate without departing from the disclosure.

The display 104 may be a video output device for displaying images. The display 104 may be a display of any suitable technology, such as a liquid crystal display, an organic light emitting diode display, electrophoretic display, electrowetting display, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104.

The input/output device interfaces 1110 may also include an interface for an external peripheral device connection such as universal serial bus (USB), FireWire, Thunderbolt, Ethernet port or other connection protocol that may connect to networks 1120. The input/output device interfaces 1110 may also include a connection to antenna 1122 to connect one or more networks 1120 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 and/or the server 112 further includes an encoder/decoder module 1124, which may comprise processor-executable instructions stored in storage 1108 to be executed by controller(s)/processor(s) 1104 (e.g., software, firmware), hardware, or some combination thereof. For example, components of the encoder/decoder module 1124 may be part of a software application running in the foreground and/or background on the device 102 and/or server 112. The encoder/decoder module 1124 may control the device 102 and/or server 112 as discussed above, for example with regard to FIGS. 1, 4, 5. 6A-6H, 7, 9A-9B and/or 10A-10B. Some or all of the controllers/modules of the encoder/decoder module 1124 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable instructions for operating the device 102 and/or server 112 and their various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

The components of the device(s) 102 and/or server(s) 112, as illustrated in FIGS. 11A-11B, are exemplary, and may be located a stand-alone device or may be included, in whole or in part, as a component of a larger device or system.

As shown in FIG. 12, multiple devices may be connected over a network 1120. The network 1120 may include a local or private network or may include a wide network such as the internet. Devices may be connected to the network 1120 through either wired or wireless connections. For example, a smart phone 102a may be connected to the network 1120 through a wireless service provider. Other devices, such as laptop computer 102b, tablet computer 102c, desktop computer 102d, television 102e, headless device 102f and/or server 112, may connect to the network 1120 through a wired connection. The server 112 may be configured to receive, store, process and/or stream data related to image data and/or video data displayed on one or more of the smartphone 102a, laptop computer 102b, tablet computer 102c, desktop computer 102d and television 102e (either directly or via the headless device 102f), etc. For example, the server 112 may perform any of the steps described above with regard to FIGS. 1, 4, 5. 6A-6H, 7, 9A-9B and/or 10A-10B. Alternatively, the server 112 may receive and store data generated by the smartphone 102a, laptop computer 102b, tablet computer 102c, desktop computer 102d, etc. using any of the steps described above. Thus, the sever 112 may process and output data, image data and video data to allow convenient access to any of the devices connected to the server 112.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of determining a resolution for image data during encoding using an electronic device, the method comprising:

receiving, by the electronic device, first image data;

determining a region of interest within the first image data;

determining a first digital gain associated with the region of interest, wherein the first digital gain corresponds to an amount of amplification of a signal from a camera sensor of the electronic device;

determining that the first digital gain is below a threshold value, wherein the threshold value indicates an amount of high frequency information included in the region of interest, the high frequency information corresponding to transitions between pixel values in close proximity in the region of interest;

determining a reduced resolution using the first digital gain and a first resolution associated with the first image data;

determining a reduced frame rate using the first digital gain and a first frame rate associated with the first image data;

generating downscaled image data from the first image data using the reduced resolution and the reduced frame rate, wherein the reduced resolution of the downscaled image data is smaller than the first resolution of the first image data;

encoding the downscaled image data to generate first encoded image data; and transmitting the first encoded image data.

2. The computer-implemented method of claim 1, further comprising:

receiving, by the electronic device, second image data;

determining a second digital gain associated with the second image data, the second digital gain being higher than the first digital gain;

determining that the second digital gain is below the threshold value; and determining a second reduced resolution based on the second digital gain and a second resolution associated with the second image data, the second reduced resolution larger than the reduced resolution and smaller than the second resolution.

3. The computer-implemented method of claim 1, wherein encoding further comprises:

generating an intra-coded picture frame associated with the first image data, wherein the intra-coded picture frame is configured to be decoded without reference to neighboring frames and to be used to decode a group of subsequent frames;

determining a first aspect ratio based on the reduced resolution, wherein the first aspect ratio is different than a second aspect ratio associated with frames preceding the group of subsequent frames;

inserting the first aspect ratio in a header of the intra-coded picture frame; and appending the intra-coded picture frame in the first encoded image data, wherein the appending further comprises inserting the intra-coded picture frame prior to the group of subsequent frames.

4. The computer-implemented method of claim 3, further comprising:

receiving, by a remote device, the first encoded image data;

identifying, by the remote device, the intra-coded picture frame using the header;

determining, by the remote device, the first aspect ratio from the header;

determining, by the remote device, the reduced resolution using on the first aspect ratio and a resolution of the intra-coded picture frame; and decoding, by the remote device, the intra-coded picture frame and the group of subsequent frames using the reduced resolution.

5. A computer-implemented method, the method comprising:

receiving, by a first device, image data, the image data having a first resolution and associated with a first frame rate;

receiving image data characteristics, wherein the image data characteristics identify a complexity of the image data;

determining a region of interest within the image data;

determining that a metric value associated with the image data characteristics in the region of interest is below a first threshold value;

determining a downscale factor, wherein the downscale factor corresponds to at least one of a reduced resolution or a reduced frame rate;

generating downscaled image data from the image data using the downscale factor;

generating first upscaled image data from the downscaled image data based on an inverse of the downscale factor;

determining a similarity between the first upscaled image data and the image data using a structural similarity index;

determining that the similarities exceed a second threshold value;

encoding the downscaled image data to generate encoded data; and transmitting the encoded data to a second device.

6. The computer-implemented method of claim 5, wherein determining the downscale factor further comprises:

determining a quantization parameter associated with the image data based on the image data characteristics, wherein the quantization parameter indicates an amount of spatial detail included in the image data; and determining that the quantization parameter is below the first threshold value; and determining the downscale factor based on the quantization parameter.

7. The computer-implemented method of claim 5, wherein determining the downscale factor further comprises:

determining a quantization parameter associated with the image data based on the image data characteristics, wherein the quantization parameter indicates an amount of spatial detail included in the image data;

determining that the quantization parameter exceeds the first threshold value; and determining not to downscale the image data.

8. The computer-implemented method of claim 5, wherein determining the downscale factor further comprises:

determining a digital gain of a camera sensor of the first device, based on the image data characteristics;

determining that the digital gain is below the first threshold value; and determining the downscale factor based on the digital gain.

9. The computer-implemented method of claim 5, wherein encoding further comprises:

generating an intra-coded picture frame associated with the image data, wherein the intra-coded picture frame is configured to be decoded without reference to neighboring frames and to be used to decode subsequent frames;

determining a first aspect ratio based on the downscale factor, wherein the first aspect ratio is different than a second aspect ratio associated with frames preceding the intra-coded picture frame;

associating the first aspect ratio with the intra-coded picture frame; and appending the intra-coded picture frame in the encoded image data.

10. The computer-implemented method of claim 5, further comprising:

determining the metric value based on one of frequency analysis, temporal complexity, spatial complexity or a standard deviation for color values.

11. The computer-implemented method of claim 5, wherein determining the downscale factor further comprises:

determining a first power consumption associated with first downscale factor;

determining a second power consumption associated with a second downscale factor;

determining a difference between the first power consumption and the second power consumption;

determining that the difference exceeds a third threshold value; and determining that the second downscale factor is the downscale factor.

12. A device, comprising:

at least one processor;

a memory device including instructions operable to be executed by the at least one processor to cause the device to:

receiving, by a first device, image data, the image data having a first resolution and associated with a first frame rate;

receiving image data characteristics, wherein the image data characteristics identify a complexity of the image data;

determining a region of interest within the image data;

determining that a metric value associated with the image data characteristics in the region of interest is below a threshold value;

determining a downscale factor, wherein the downscale factor corresponds to at least one of a reduced resolution or a reduced frame rate;
generating downscaled image data from the image data using the downscale factor;
encoding the downscaled image data to generate encoded data, wherein the encoding further comprises:
generating an intra-coded picture frame associated with the image data, wherein the intra-coded picture frame is configured to be decoded without reference to neighboring frames and to be used to decode subsequent frames,
determining a first aspect ratio based on the downscale factor, wherein the first aspect ratio is different than a second aspect ratio associated with frames preceding the intra-coded picture frame,
associating the first aspect ratio with the intra-coded picture frame, and
appending the intra-coded picture frame in the encoded image data; and
transmitting the encoded data to a second device.

13. The device of claim 12, wherein the instructions further configure the system for:
determining a quantization parameter associated with the image data based on the image data characteristics, wherein the quantization parameter indicates an amount of spatial detail included in the image data;
determining that the quantization parameter is below a threshold value; and
determining the downscale factor based on the quantization parameter.

14. The device of claim 12, wherein the instructions further configure the system for:
determining a quantization parameter associated with the image data based on the image data characteristics, wherein the quantization parameter indicates an amount of spatial detail included in the image data;
determining that the quantization parameter exceeds the threshold value; and
determining not to downscale the image data.

15. The device of claim 12, wherein the instructions further configure the system for:
determining a digital gain of a camera sensor of the device, based on the image data characteristics;
determining that the digital gain is below the threshold value; and
determining the downscale factor based on the digital gain.

16. The device of claim 12, wherein the instructions further configure the system for:
determining the metric value based on one of frequency analysis, temporal complexity, spatial complexity or a standard deviation for color values.

17. The device of claim 12, wherein the instructions further configure the system for:
determining a first power consumption associated with a first downscale factor;
determining a second power consumption associated with a second downscale factor;
determining a difference between the first power consumption and the second power consumption;
determining that the difference exceeds a second threshold value; and
determining that the second downscale factor is the downscale factor.

18. The device of claim 12, wherein, prior to encoding, the instructions further configure the system for:
generating first upscaled image data from the downscaled image data based on an inverse of the downscale factor;
determining a similarity between the first upscaled image data and the image data using a structural similarity index; and
determining that the similarities exceed a second threshold value.

19. A computer-implemented method, the method comprising:
receiving, by a first device, image data, the image data having a first resolution and associated with a first frame rate;
receiving image data characteristics, wherein the image data characteristics identify a complexity of the image data;
determining a region of interest within the image data;
determining a quantization parameter associated with the image data based on the image data characteristics in the region of interest, wherein the quantization parameter indicates an amount of spatial detail included in the image data;
determining that the quantization parameter is below a threshold value;
determining a downscale factor based on the quantization parameter, wherein the downscale factor corresponds to at least one of a reduced resolution or a reduced frame rate;
generating downscaled image data from the image data using the downscale factor;
encoding the downscaled image data to generate encoded data; and
transmitting the encoded data to a second device.

20. A computer-implemented method, the method comprising:
receiving, by a first device, image data, the image data having a first resolution and associated with a first frame rate;
receiving image data characteristics, wherein the image data characteristics identify a complexity of the image data;
determining a region of interest within the image data;
determining, based on the image data characteristics, a digital gain of a camera sensor of the first device;
determining that the digital gain is below a threshold value;
determining a downscale factor based on the digital gain, wherein the downscale factor corresponds to at least one of a reduced resolution or a reduced frame rate;
generating downscaled image data from the image data using the downscale factor;
encoding the downscaled image data to generate encoded data; and
transmitting the encoded data to a second device.

21. A computer-implemented method, the method comprising:
receiving, by a first device, image data, the image data having a first resolution and associated with a first frame rate;
receiving image data characteristics, wherein the image data characteristics identify a complexity of the image data;
determining a region of interest within the image data;
determining that a metric value associated with the image data characteristics in the region of interest is below a threshold;

determining a downscale factor, wherein the downscale factor corresponds to at least one of a reduced resolution or a reduced frame rate, and determining the downscale factor further comprises:
  determining a first power consumption associated with a first downscale factor,
  determining a second power consumption associated with a second downscale factor,
  determining a difference between the first power consumption and the second power consumption,
  determining that the difference exceeds a threshold, and
  selecting the second downscale factor as the downscale factor;
generating downscaled image data from the image data using the downscale factor;
encoding the downscaled image data to generate encoded data; and
transmitting the encoded data to a second device.

* * * * *